US010444440B2

(12) United States Patent
Verheyden et al.

(10) Patent No.: US 10,444,440 B2
(45) Date of Patent: Oct. 15, 2019

(54) FIBER OPTIC CONNECTION SYSTEM

(71) Applicant: CommScope Connectivity Belgium BVBA, Kessel-Lo (BE)

(72) Inventors: Danny Willy August Verheyden, Gelrode (BE); Johan Geens, Bunsbeek (BE); Lodewijk Van Noten, Leuven (BE); Stephane Collart, Olen (BE); Dirk Jozef G. Van De Weyer, Beringen (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/040,008

(22) Filed: Jul. 19, 2018

(65) Prior Publication Data

US 2019/0018202 A1    Jan. 17, 2019

Related U.S. Application Data

(63) Continuation of application No. 15/033,648, filed as application No. PCT/EP2014/073213 on Oct. 29, 2014, now Pat. No. 10,048,447.

(60) Provisional application No. 61/898,159, filed on Oct. 31, 2013.

(51) Int. Cl.
    *G02B 6/00*          (2006.01)
    *G02B 6/38*          (2006.01)

(52) U.S. Cl.
    CPC ......... *G02B 6/3825* (2013.01); *G02B 6/3879* (2013.01); *G02B 6/3893* (2013.01); *G02B 6/3897* (2013.01)

(58) Field of Classification Search
    CPC .. G02B 6/3825; G02B 6/3879; G02B 6/3897; G02B 6/3893
    See application file for complete search history.

(56) References Cited

U.S. PATENT DOCUMENTS

| 6,102,581 A | 8/2000 | Deveau et al. |
| 6,672,898 B2 | 1/2004 | Kahle et al. |
| 6,702,475 B1 | 3/2004 | Giobbio et al. |

(Continued)

OTHER PUBLICATIONS

International Search Report and Written Opinion for International Application No. PCT/EP2014/073213 dated Jan. 22, 2015 (11 pages).

(Continued)

*Primary Examiner* — Ellen E Kim
(74) *Attorney, Agent, or Firm* — Merchant & Gould P.C.

(57) ABSTRACT

A fiber optic adapter (736/836) includes a body configured to mate a first fiber optic connector (12) with a second fiber optic connector (50), the first and second fiber optic connectors (12,50) including latches (60) for mating with catches (771) of the adapter (736/836) for releasably engaging the first and second connectors (12,50) with the fiber optic adapter (736/836), wherein the latches (60) are configured to be unlatched from the catches (771) by direct contact with the latches (60). The adapter (736/836) includes a release mechanism (702/802) for allowing a user to release the latch (60) of at least one of the first and second fiber optic connectors (12,50) from the adapter (736/836) without directly contacting the latch (60) of the at least one of the first and second fiber optic connectors (12,50).

6 Claims, 56 Drawing Sheets

(56) References Cited

U.S. PATENT DOCUMENTS

| | | | |
|---|---|---|---|
| 6,908,233 B2* | 6/2005 | Nakajima | G02B 6/3807 |
| | | | 385/53 |
| 7,182,524 B2 | 2/2007 | Kramer et al. | |
| 8,628,252 B2 | 1/2014 | Matsumoto et al. | |
| 8,764,308 B2* | 7/2014 | Irwin | G02B 6/3879 |
| | | | 385/56 |
| 9,684,130 B2* | 6/2017 | Veatch | G02B 6/3831 |
| 9,761,998 B2* | 9/2017 | De Dios Martin | |
| | | | H01R 13/6272 |
| 2002/0076164 A1 | 6/2002 | Childers et al. | |
| 2003/0190123 A1 | 10/2003 | Kahle et al. | |
| 2008/0112671 A1 | 5/2008 | Kanou et al. | |
| 2010/0260457 A1 | 10/2010 | Watanabe | |
| 2011/0222819 A1 | 9/2011 | Anderson et al. | |
| 2015/0247977 A1 | 9/2015 | Shimakawa | |
| 2016/0018604 A1 | 1/2016 | Gurreri et al. | |

OTHER PUBLICATIONS

U.S. Appl. No. 61/831,392 filed Jun. 5, 2013 entitled "Fiber Optic Adapter."

\* cited by examiner

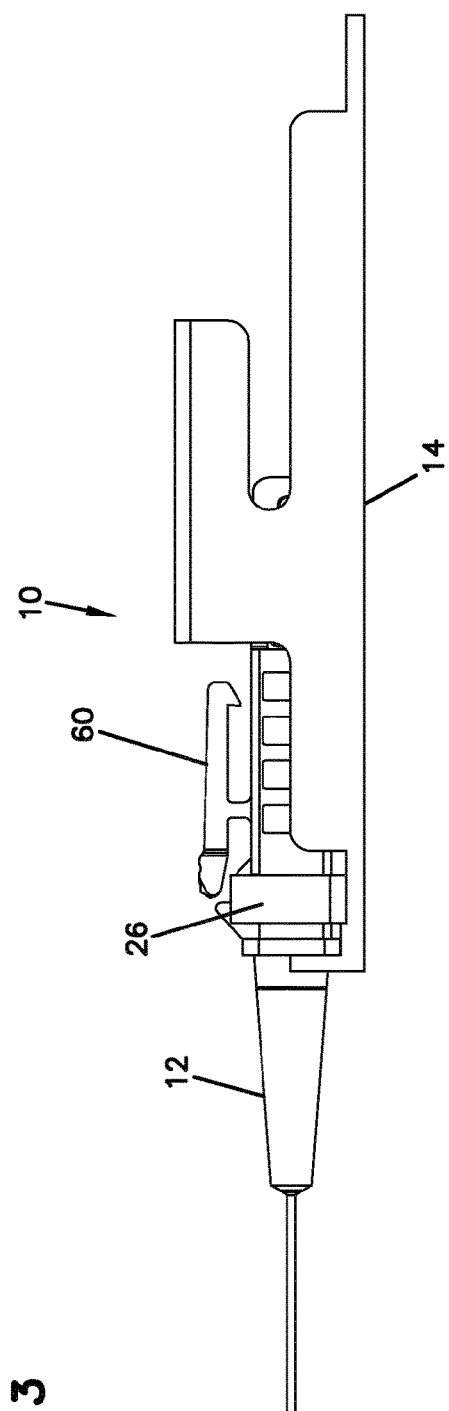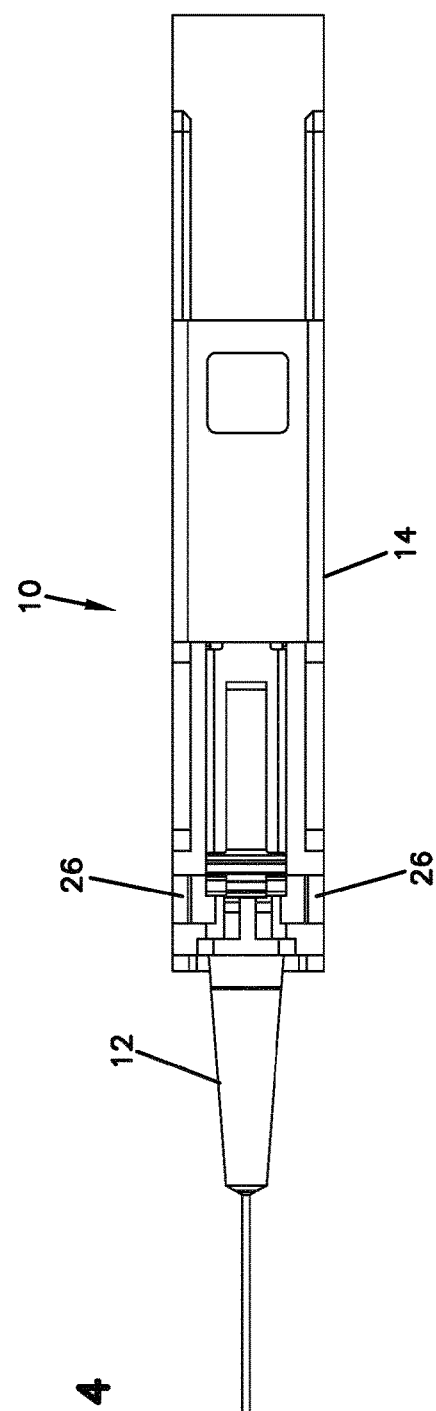
FIG. 3
FIG. 4

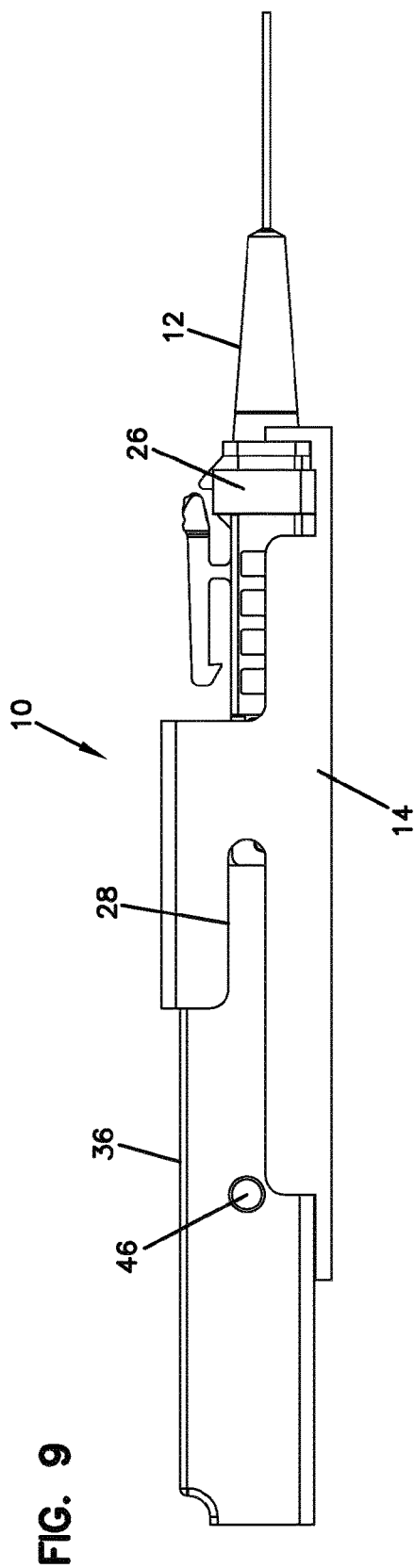
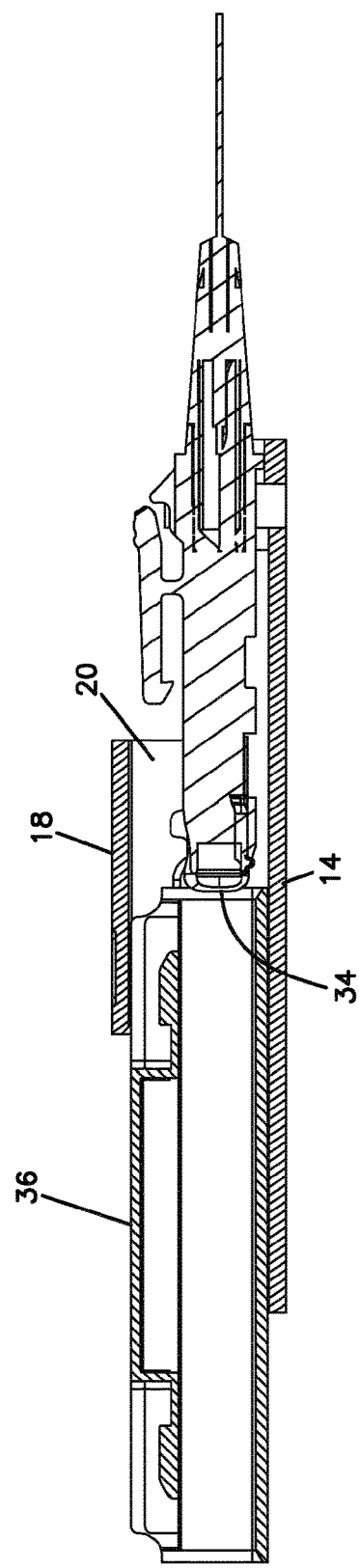

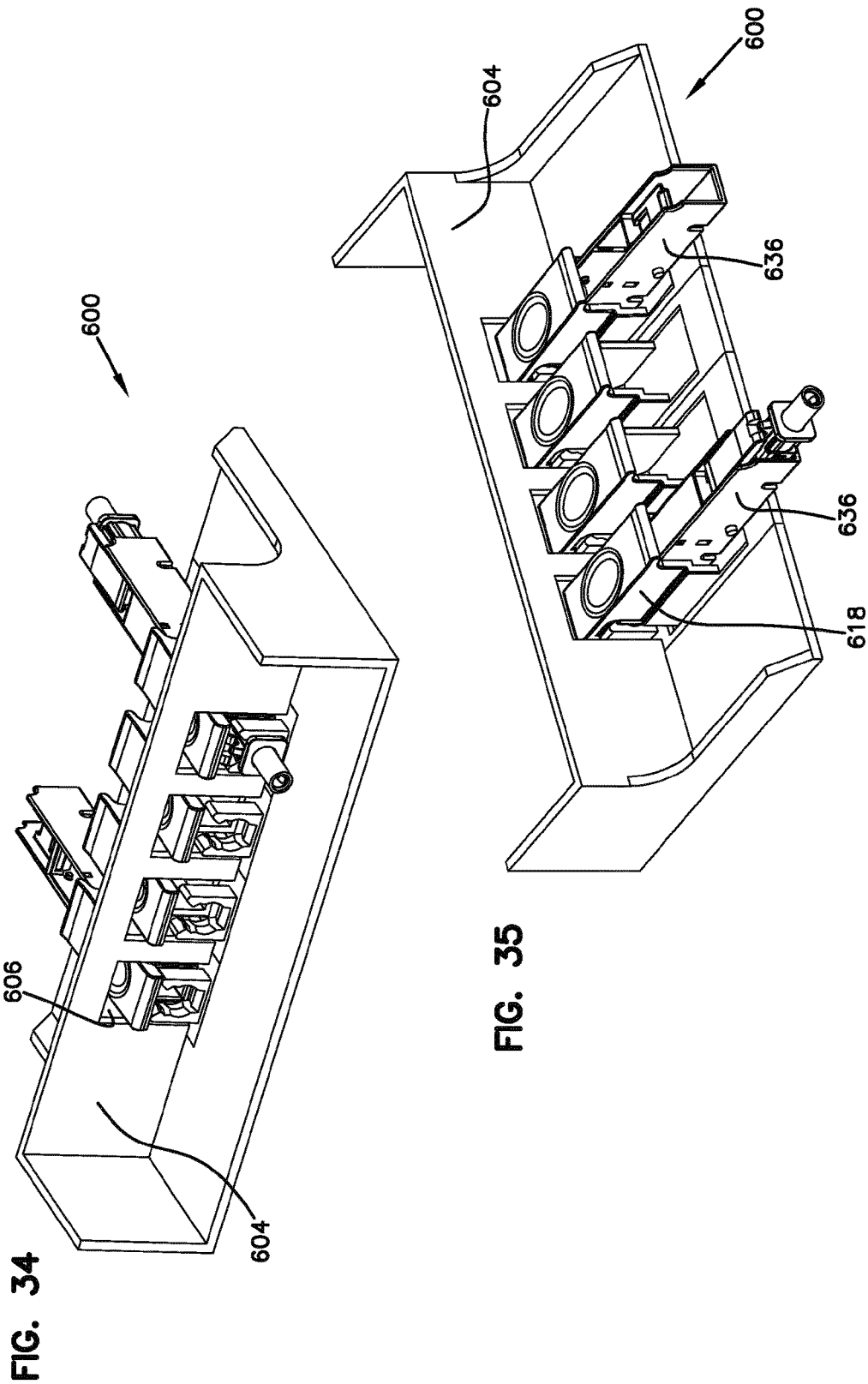

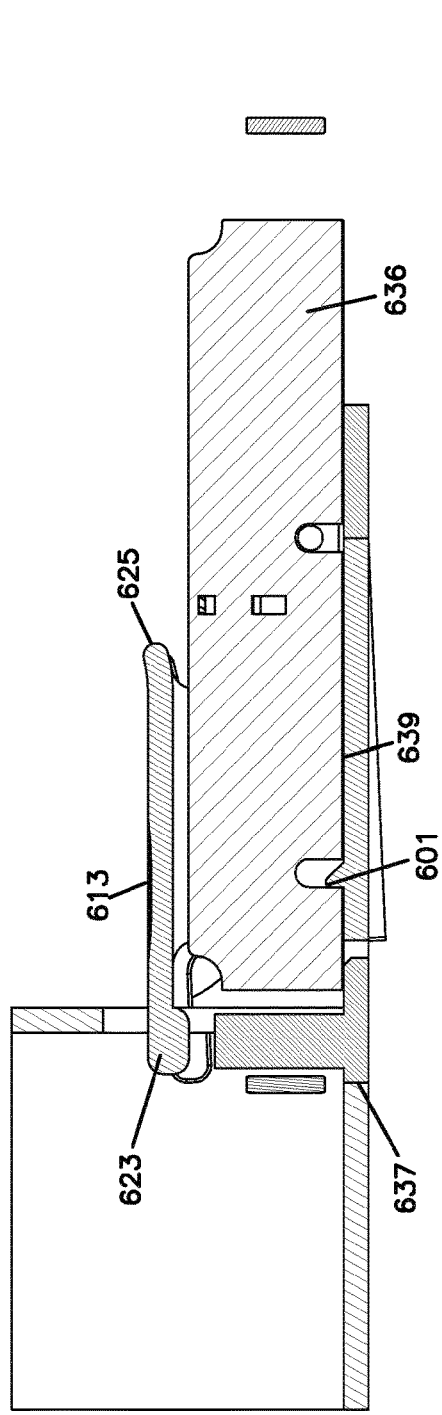
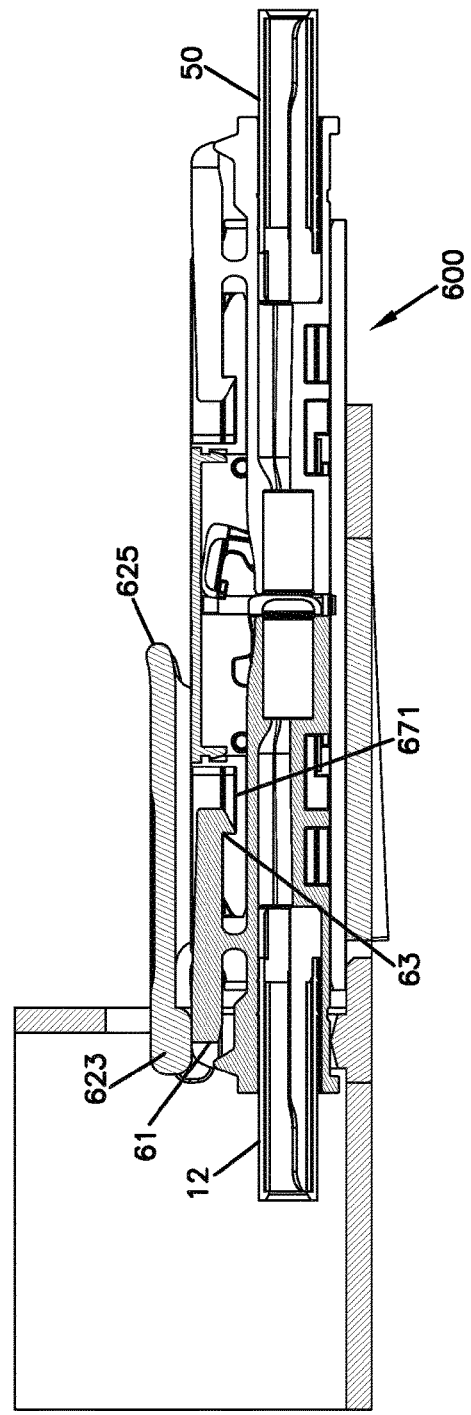
FIG. 40
FIG. 41

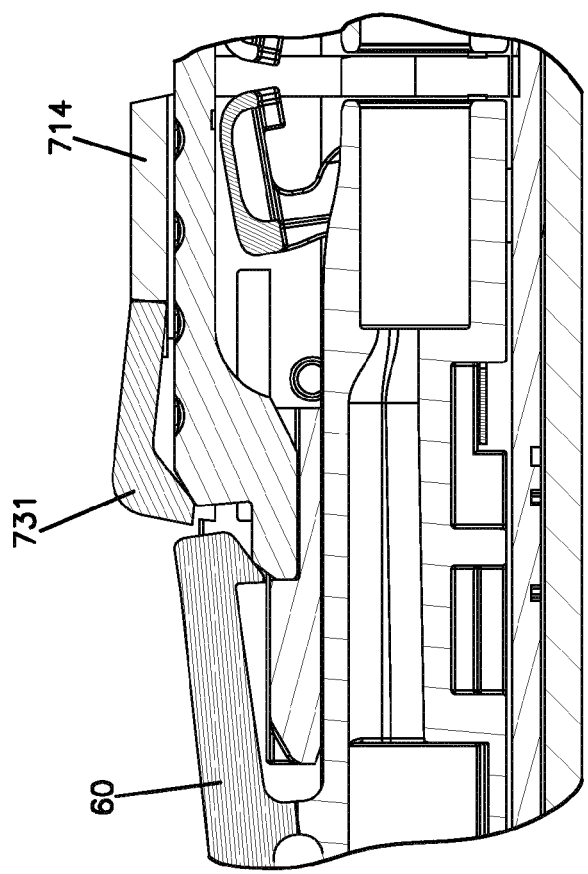

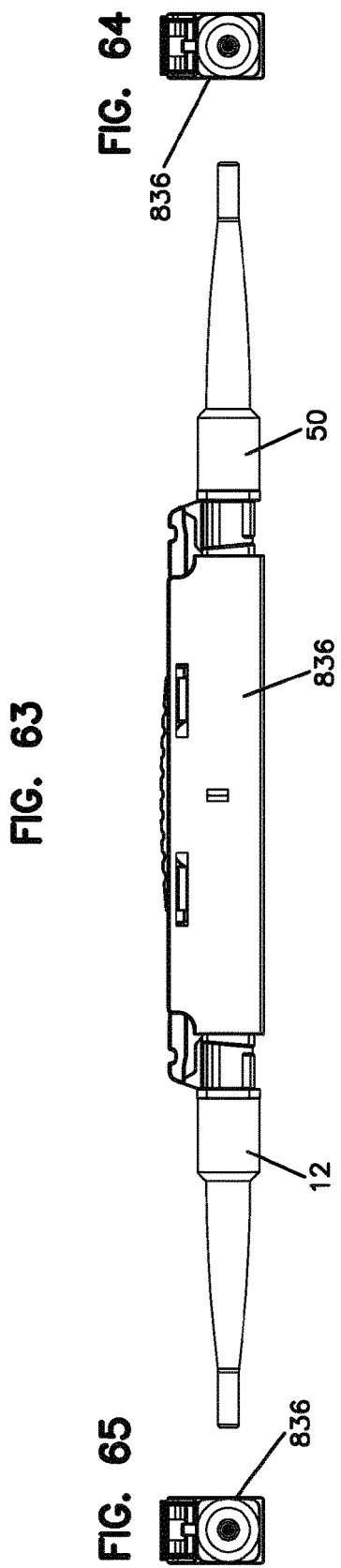

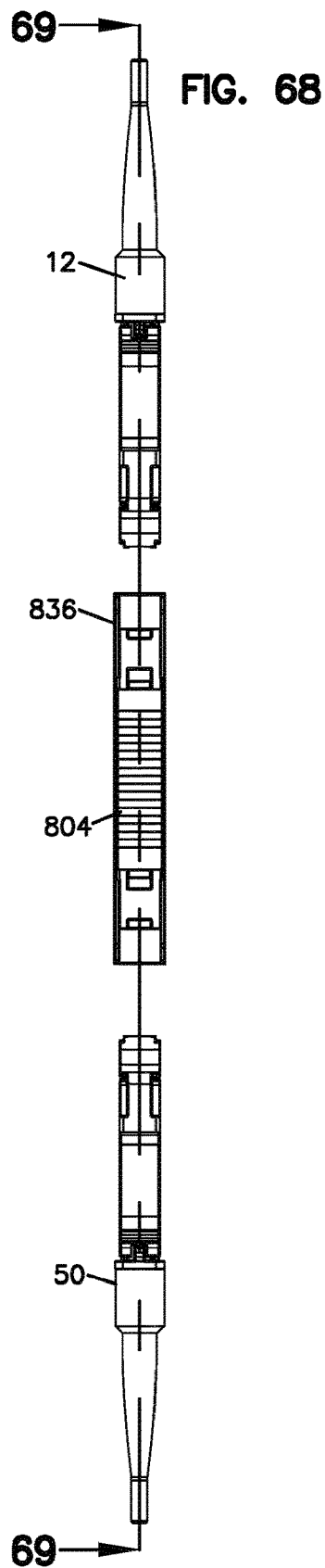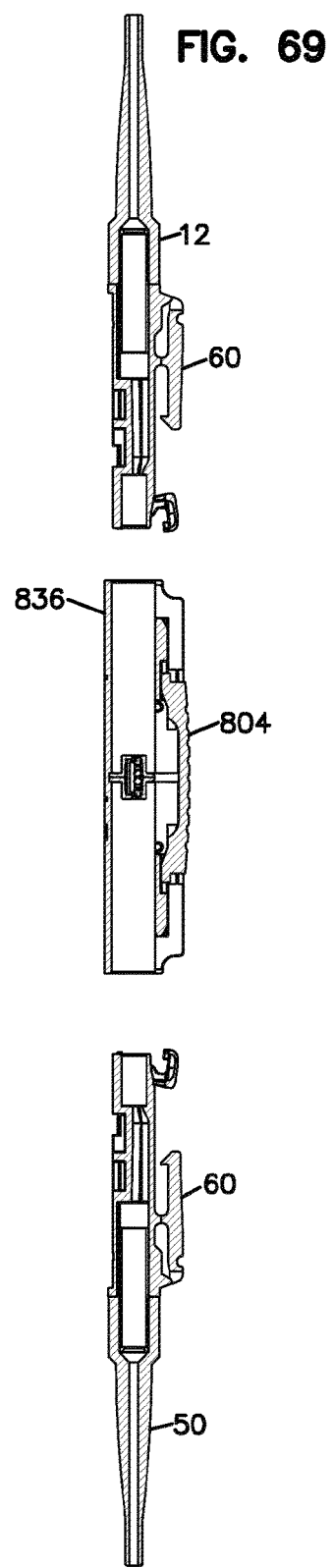

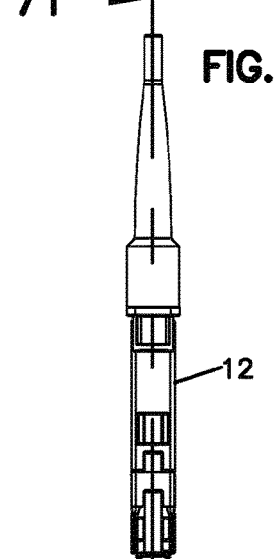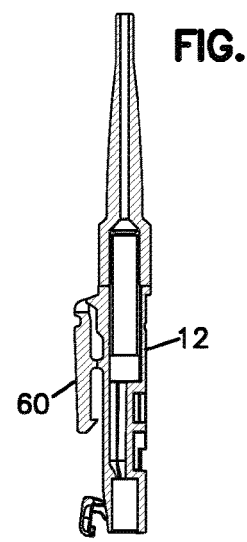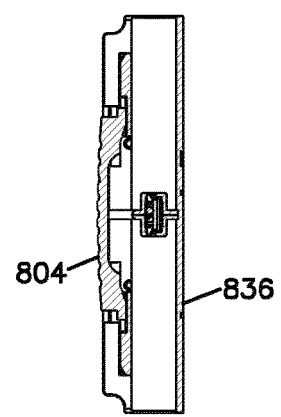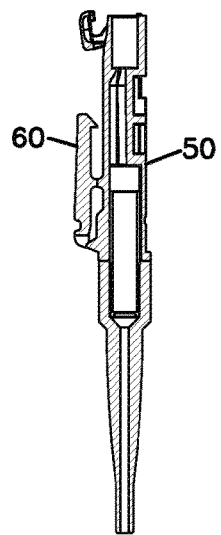

FIBER OPTIC CONNECTION SYSTEM

CROSS REFERENCE TO RELATED APPLICATIONS

This application is a Continuation of U.S. patent application Ser. No. 15/033,648, filed on May 1, 2016, now U.S. Pat. No. 10,048,447, which is a National Stage of PCT/EP2014/073213, filed on Oct. 29, 2014, which claims benefit of 61/898,159, filed on Oct. 31, 2013, and which applications are incorporated herein by reference their entireties. To the extent appropriate, a claim of priority is made to each of the above disclosed applications.

BACKGROUND

The present disclosure relates generally to a fiber optic connection system. Modern optical devices and optical communications systems widely use fiber optic cables. Fiber optic cables are often used to transmit light signals for high speed data transmission. A fiber optic cable typically includes an optical fiber or optical fibers, a buffer or buffers that surrounds the fiber or fibers, a strength layer that surrounds the buffer or buffers, and an outer jacket. The optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles for receiving the fiber optic connectors desired to be interconnected). The adapter includes an internal sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. Some systems are known which include alignment of fibers but no ferrules.

Improvements in the adapters are desired.

SUMMARY OF THE INVENTION

In one implementation, a fiber optic connector is mounted to a fiber optic connector holder. The holder can be a separate piece mountable to other devices, such as trays, panels, modules, cassettes, and chassis. Alternatively, the holder can be integrally formed with the device. In some implementations, multiple holders can be provided as separate elements, or as an integral element.

The fiber optic connector holder holds the fiber optic connector in position ready for connection to another fiber optic connector at a desired time. The holder receives a fiber optic adapter, and a second fiber optic connector. The adapter aligns the two connectors for fiber optic signal transmission. In one example, the fiber optic connector holder includes a clip for clipping to the connector. In some implementations, the clip is releasable.

According to certain embodiments, the first and the second fiber optic connectors and the adapter include interlatching features for relatively fixing the connectors to the adapter. The connector(s) may be removed from the adapter by releasing the latching features. Similarly, the adapter may also be relatively removed from the connector(s) by releasing the latching features.

According to other aspects, the disclosure is directed to fiber optic connector holders that include release mechanisms for releasing the fiber optic adapter and a second fiber optic connector from a first fiber optic connector when the first fiber optic connector may not be readily accessible to a user. For example, the first fiber optic connector might be held by a holder that is part of a fixture on a device such as a tray, panel, module, cassette, or chassis, wherein the first fiber optic connector is positioned inside such a device without access to the first connector from an exterior of the device.

According to other aspects of the disclosure, the release mechanism may be an integral part of the adapter that aligns the first and second fiber optic connectors. The release mechanism of the adapter might allow a user to release the adapter and the second fiber optic connector from the first fiber optic connector when the first fiber optic connector is not readily accessible to a user (e.g., when the first fiber optic connector is supported by a holder that is part of a device such as a tray, panel, module, cassette, or chassis, wherein the first fiber optic connector is positioned inside such a device without access to the first connector from an exterior of the device).

According to one aspect of the disclosure, the disclosure is directed to a telecommunications system comprising a fiber optic adapter including a catch, a fiber optic connector including a latch configured to mate with the catch for latching the connector with the adapter, wherein the latch is configured to be unlatched from the catch by direct contact with the latch, and a fixture configured to fixedly hold the fiber optic connector for mating with the adapter, wherein the fixture includes a release mechanism for allowing a user to release the latch of the connector from the catch of the adapter without directly contacting the latch of the connector.

According to another aspect, the disclosure is directed to a fiber optic adapter comprising a body configured to mate a first fiber optic connector with a second fiber optic connector, the first and second fiber optic connectors including latches for mating with catches of the adapter for releasably engaging the first and second connectors with the fiber optic adapter, wherein the latches are configured to be unlatched from the catches by direct contact with the latches, wherein the adapter has a release mechanism for allowing a user to release the latch of at least one of the first and second fiber optic connectors from the adapter without directly contacting the latch of the at least one of the first and second fiber optic connectors.

According to another aspect, the disclosure is directed to a telecommunications system comprising a fiber optic adapter configured to mate a first fiber optic connector with a second fiber optic connector, the first fiber optic connector mounted to the fiber optic adapter, the second fiber optic connector mounted to the fiber optic adapter for optically mating with the first fiber optic connector, wherein both of the first and second fiber optic connectors include latches for mating with catches of the fiber optic adapter for releasably engaging the first and second connectors with the fiber optic adapter, the latches configured to be unlatched from the catches by direct contact with the latches, wherein the adapter has a release mechanism for allowing a user to release the latch of at least one of the first and second fiber optic connectors from the adapter without directly contacting the latch of the at least one of the first and second fiber optic connectors.

According to another aspect, the disclosure is directed to a method of unlatching a fiber optic connector that is fixedly held by a fixture from a fiber optic adapter without directly contacting a latch of the fiber optic connector that mates with a catch of the fiber optic adapter, the method comprising contacting the latch of the fiber optic connector with a portion of a release mechanism located on the fixture to separate the latch of the fiber optic connector from the catch of the fiber optic adapter.

According to another aspect, the disclosure is directed to a method of unlatching a fiber optic connector from a fiber optic adapter without directly contacting a latch of the fiber optic connector that mates with a catch of the fiber optic adapter, the method comprising contacting the latch of the fiber optic connector with a portion of a release mechanism located on the fiber optic adapter to separate the latch of the fiber optic connector from the catch of the fiber optic adapter.

According to another aspect, the disclosure is directed to a telecommunications system comprising a fixture defining a pocket for receiving a fiber optic adapter, the pocket defining an adapter insertion first end and an opposite second end, the fiber optic adapter inserted into the pocket from the first end, the fiber optic adapter including a catch, a fiber optic connector inserted into the pocket from the second end, the fiber optic connector including a latch configured to mate with the catch (571/671/771) for latching the connector with the adapter, wherein the latch is configured to be unlatched from the catch by direct contact with the latch, and a release mechanism provided on the fiber optic adapter or on the fixture for allowing a user to release the latch of the connector from the catch of the adapter without directly contacting the latch of the connector, the release mechanism operable by the user from adjacent the adapter insertion first end of the pocket.

According to another aspect, the disclosure is directed to a method of releasing a first fiber optic connector that has been inserted into a pocket defined by a fixture from a first end of the pocket from a fiber optic adapter that has been inserted into the pocket from a second end of the pocket, wherein the adapter is configured to mate the first fiber optic connector with a second fiber optic connector, the method comprising unlatching a latch of the first fiber optic connector that connects the first fiber optic connector to the fiber optic adapter from adjacent the second end of the pocket.

BRIEF DESCRIPTION OF THE FIGURES

FIG. 3 is a side view of the fiber optic connector and the fiber optic connector holder of FIG. 1;

FIG. 4 is a top view of the fiber optic connector and the fiber optic connector holder of FIG. 1;

FIG. 9 is a side view of the fiber optic adapter being mounted to the fiber optic connector;

FIG. 10 is a cross-sectional side view of the view of FIG. 9;

FIG. 34 illustrates the system of FIG. 33 in a fully assembled configuration;

FIG. 35 is a front perspective view of the system shown in FIG. 34;

FIG. 40 is a cross-sectional view taken along line 40-40 of FIG. 38;

FIG. 41 is a cross-sectional view taken along line 41-41 of FIG. 38;

FIGS. 52-56 illustrate the sequence of operation for releasing an adapter and a second connector of the system of FIGS. 47-51 from a first connector of the system;

FIG. 63 is a right side view of the adapter and connectors of FIG. 57;

FIG. 64 is a front view of the adapter and connectors of FIG. 57;

FIG. 65 is a rear view of the adapter and connectors of FIG. 57;

FIG. 68 is a top view of the adapter and connectors of FIG. 67;

FIG. 69 is a cross-sectional view taken along line 69-69 of FIG. 68;

FIG. 70 is a bottom view of the adapter and connectors of FIG. 67; and

FIG. 71 is a cross-sectional view taken along line 71-71 of FIG. 70.

DETAILED DESCRIPTION

Figure 1:
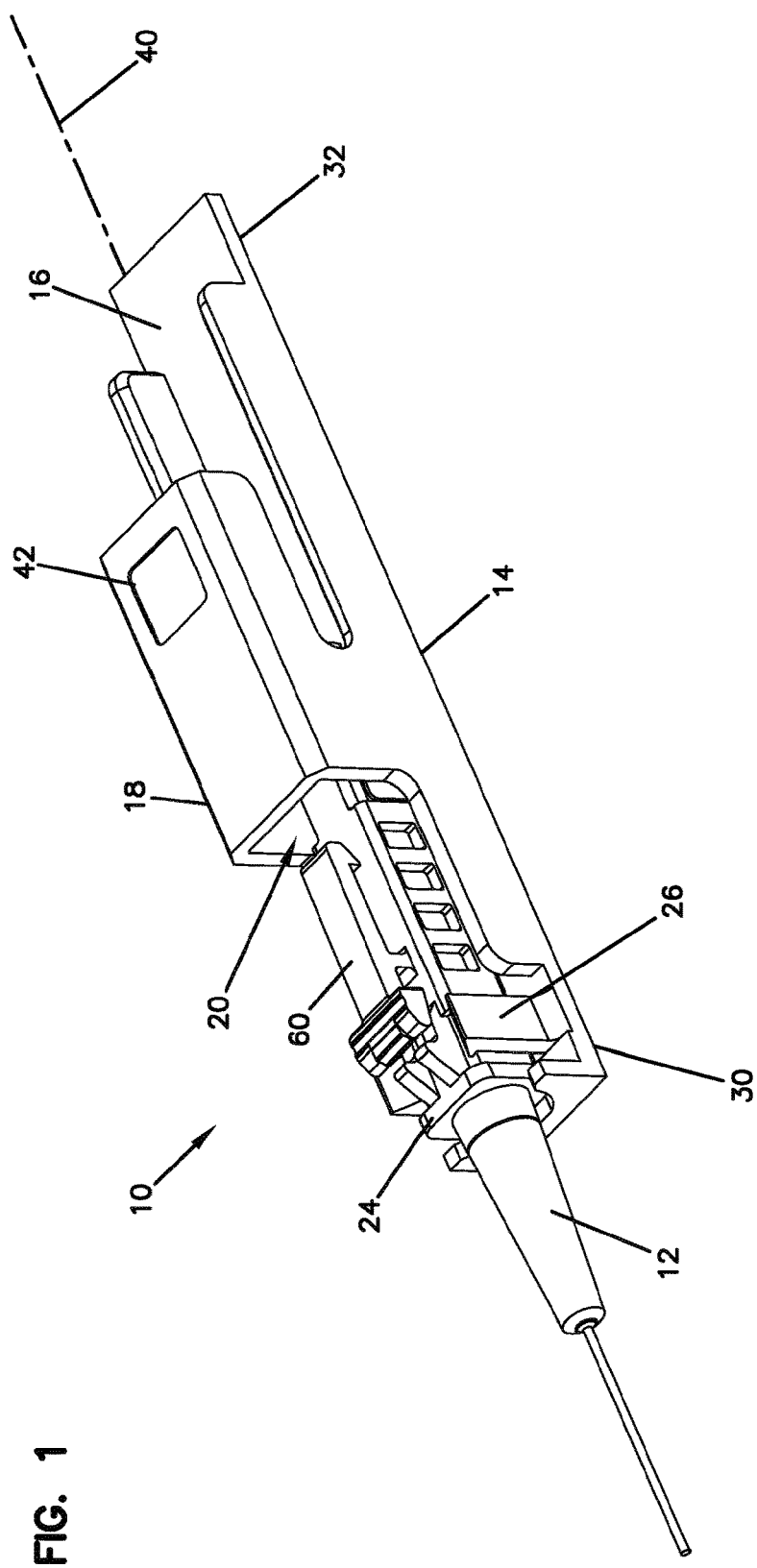
FIG. 1 is a perspective view of a fiber optic connector mounted to a fiber optic connector holder.
Figure 2:
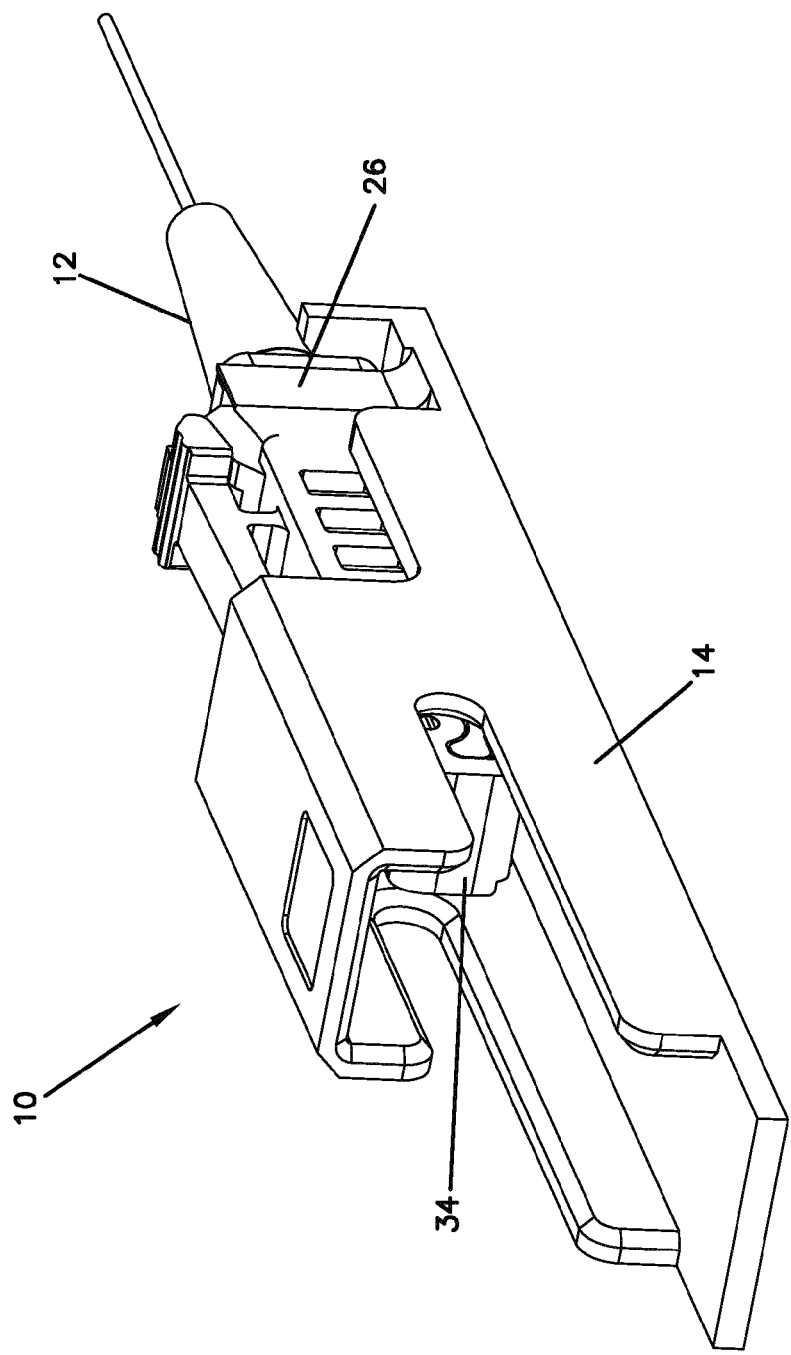
FIG. 2 is a further perspective view of the fiber optic connector and the fiber optic connector holder of FIG. 1.
Figure 5:
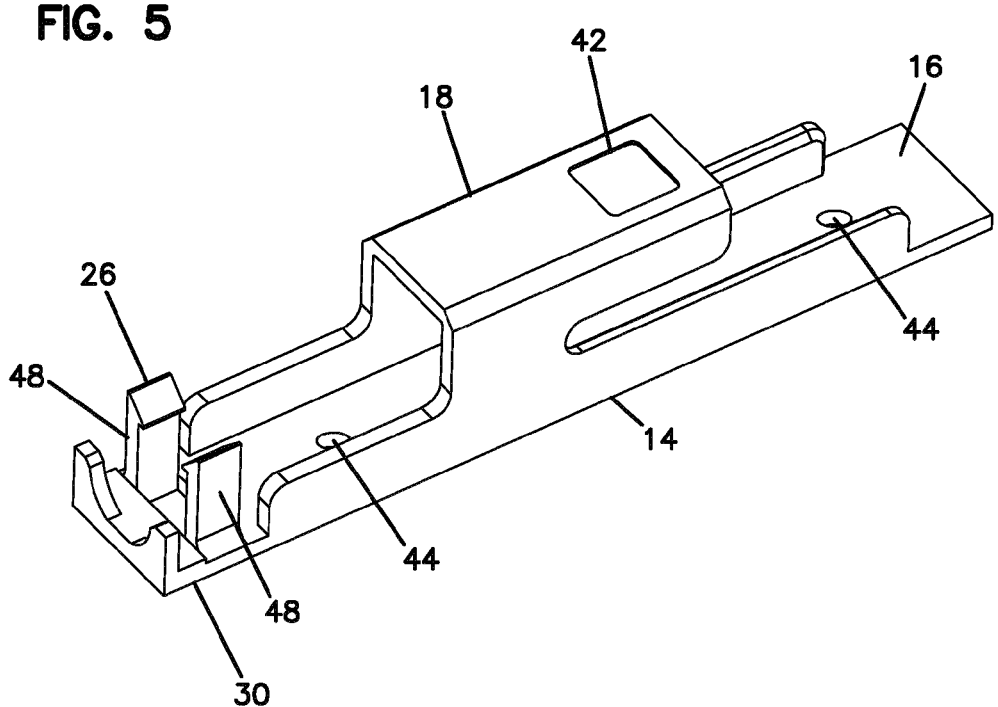
FIG. 5 is a perspective view of the fiber optic connector holder.
Figure 6:
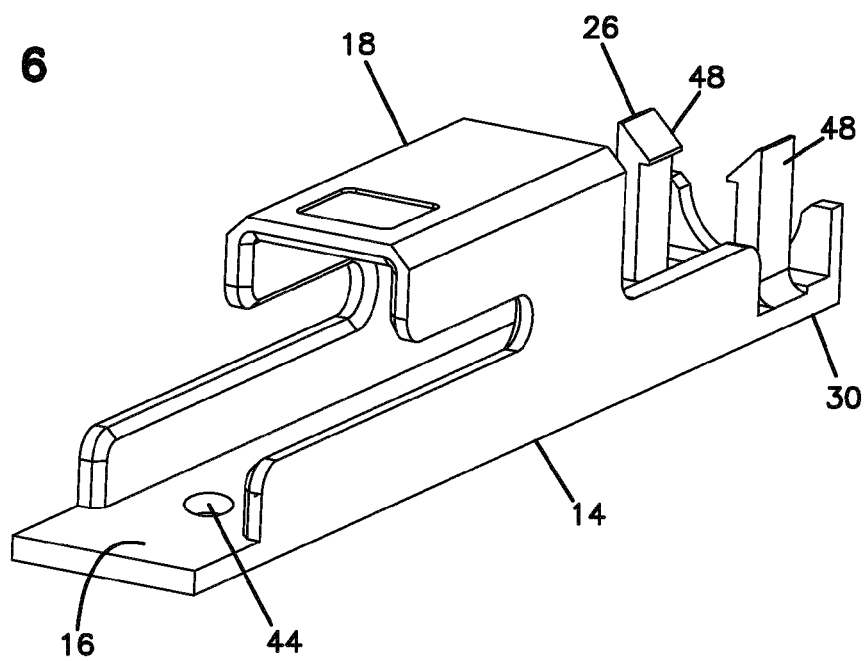
FIG. 6 is another perspective view of the fiber optic connector holder.
Figure 7:
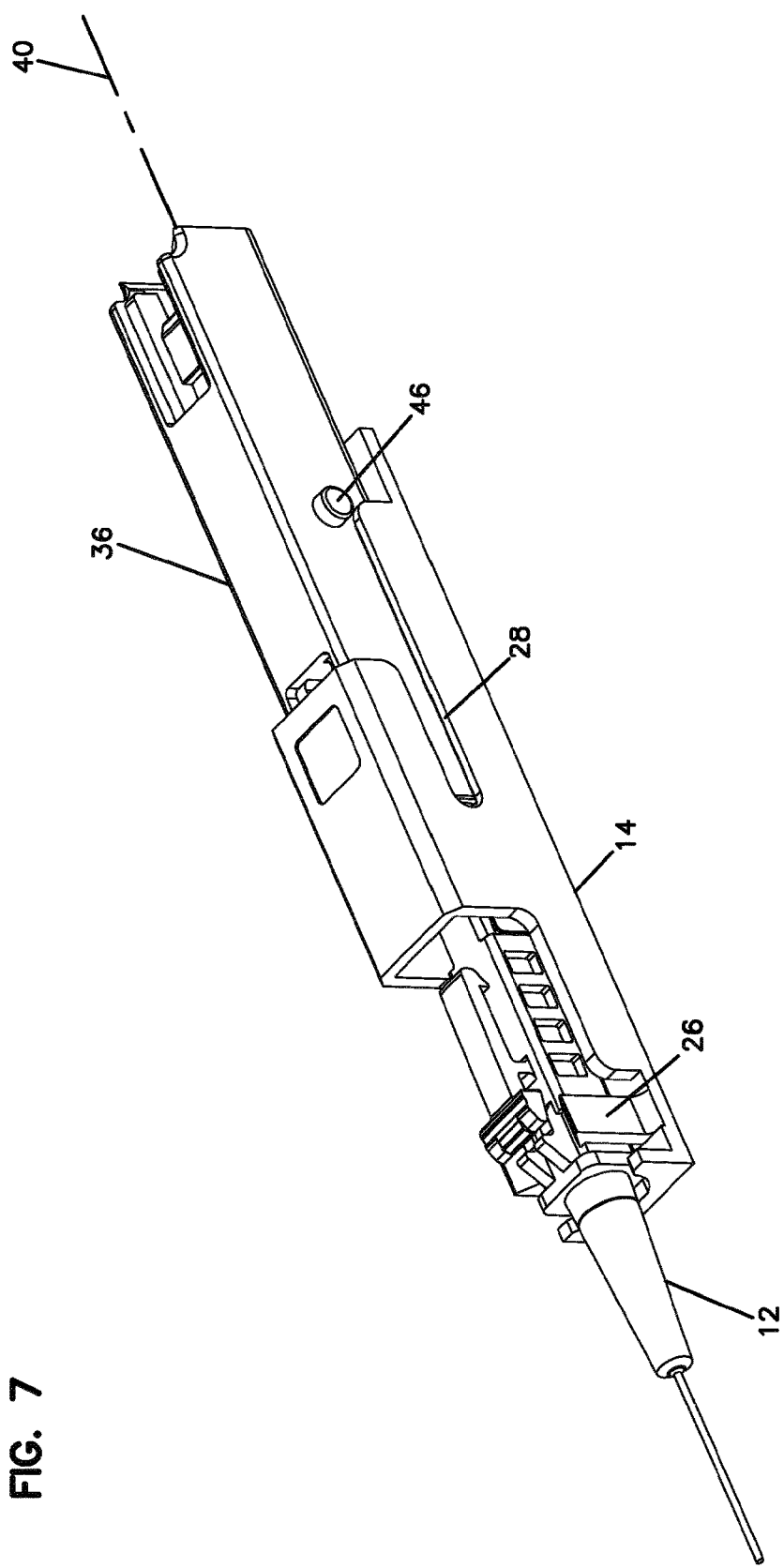
FIG. 7 shows a fiber optic adapter being mounted to the fiber optic connector held by the fiber optic connector holder of FIG. 1.
Figure 8:
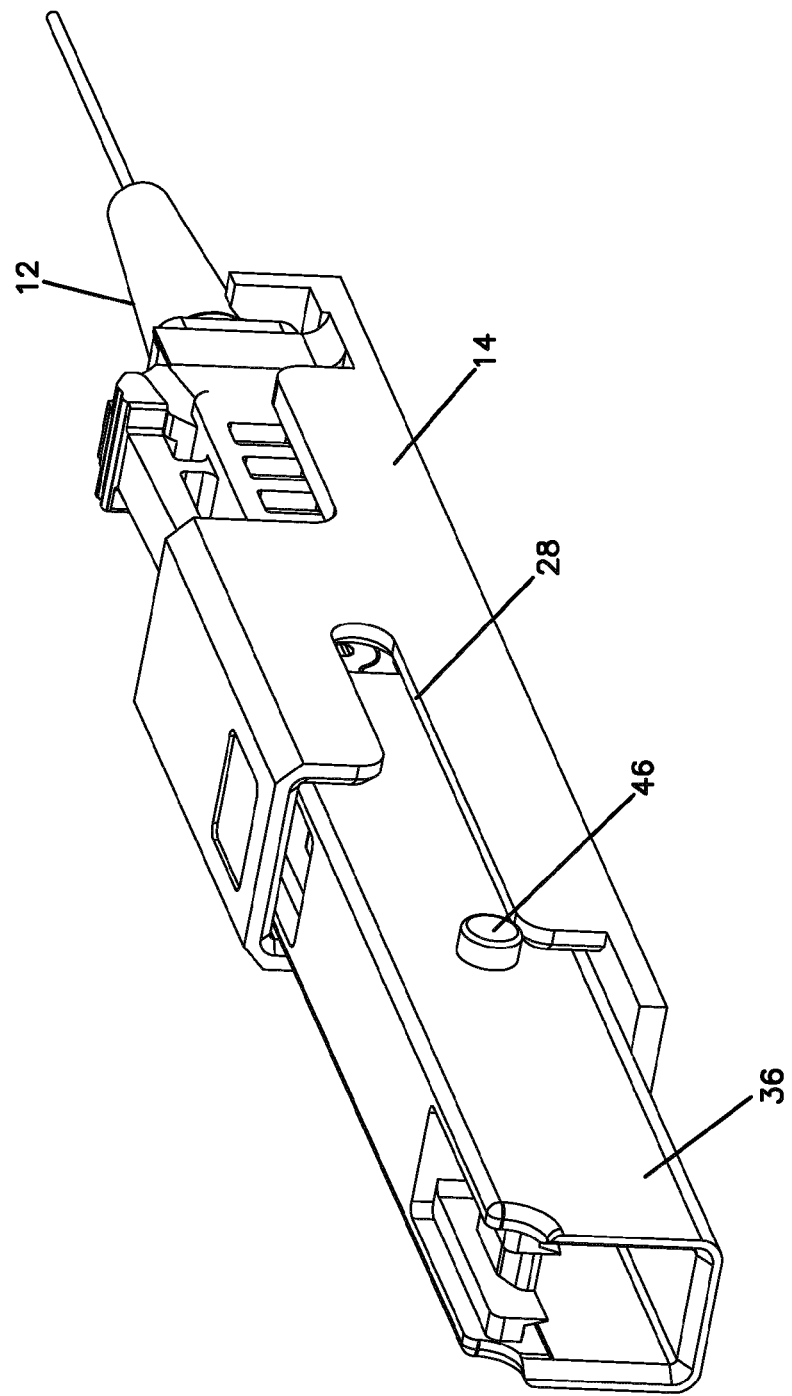
FIG. 8 is a further view of the fiber optic adapter being mounted to the fiber optic connector.
Figure 11:
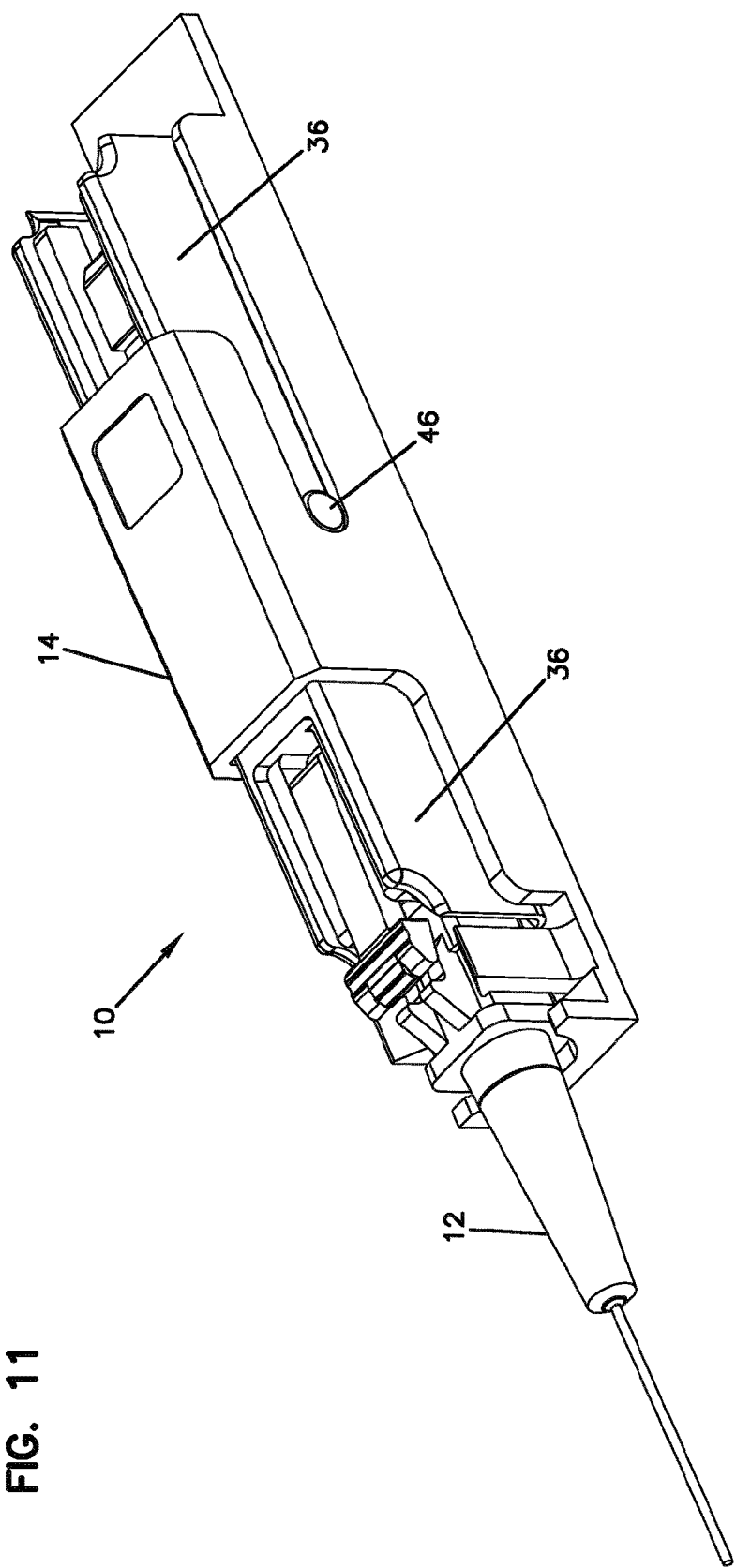
FIG. 11 is a perspective view of the fiber optic adapter fully mounted to the fiber optic connector.
Figure 12:
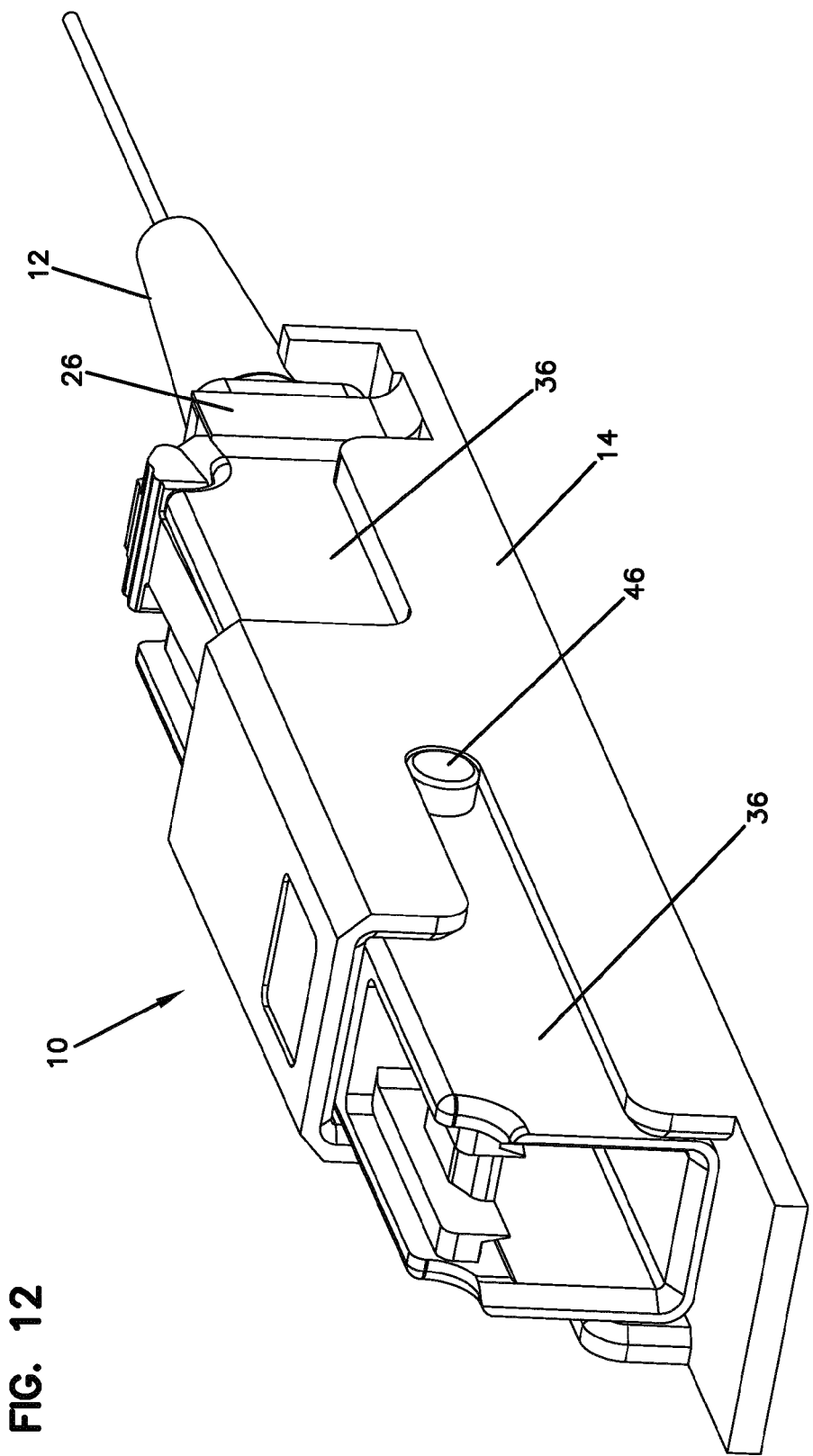
FIG. 12 is a further perspective view of the fiber optic adapter mounted to the fiber optic connector.
Figure 13:
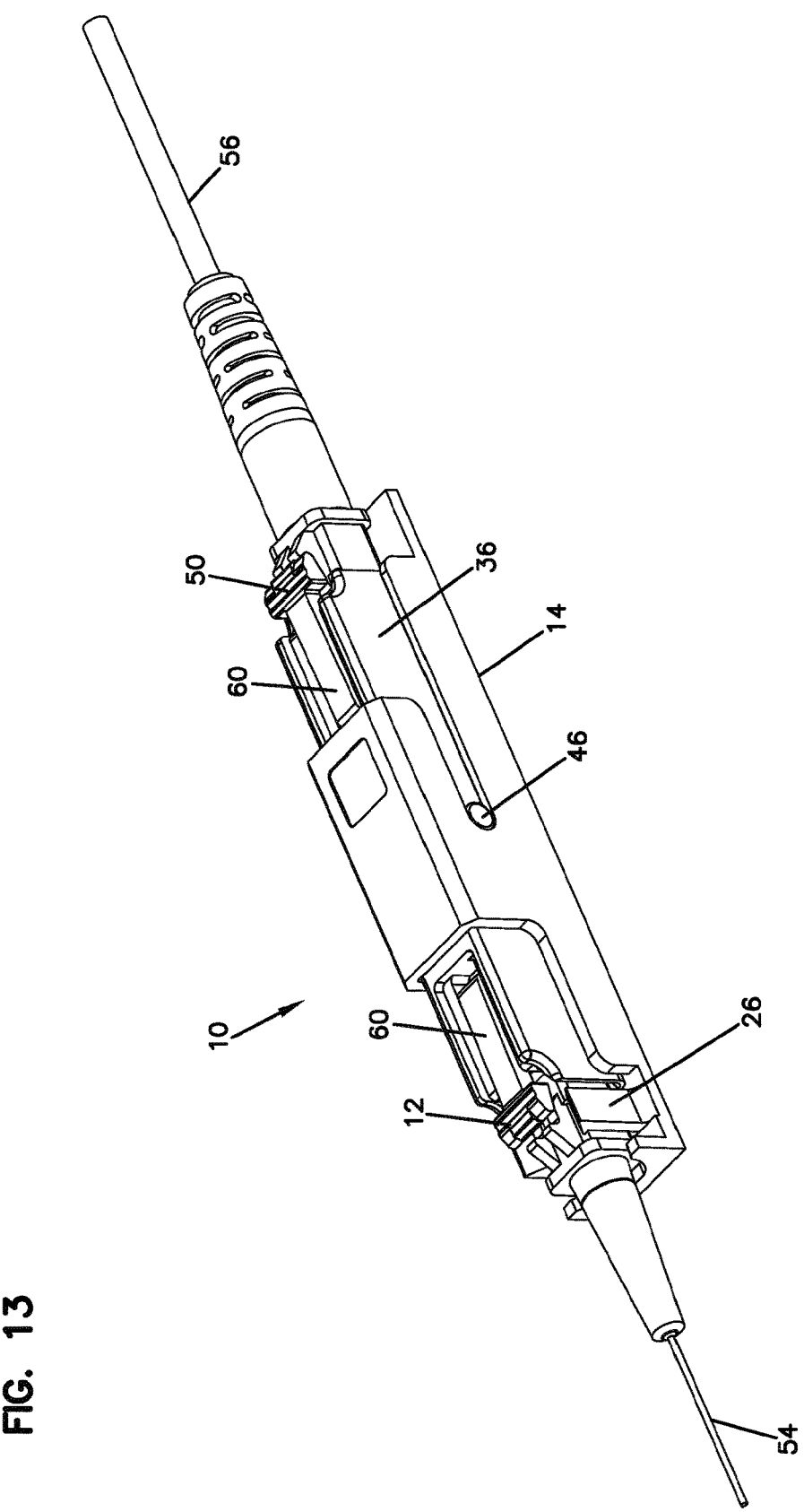
FIG. 13 is a perspective view showing a second fiber optic connector mounted to the fiber optic adapter for optical signal transmission between two fiber optic cables.
Figure 14:
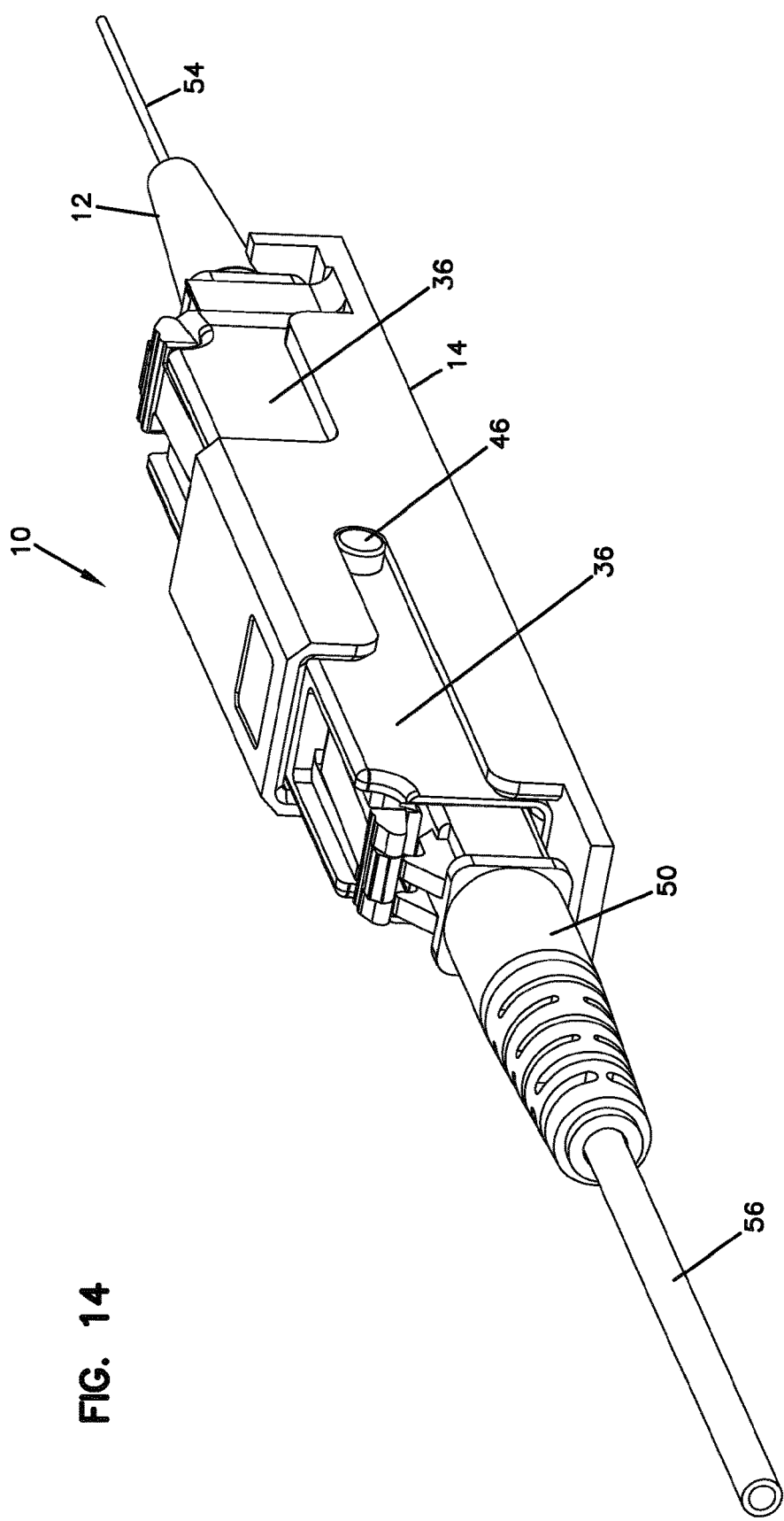
FIG. 14 is a further perspective view of the view of FIG. 13.
Figure 15:
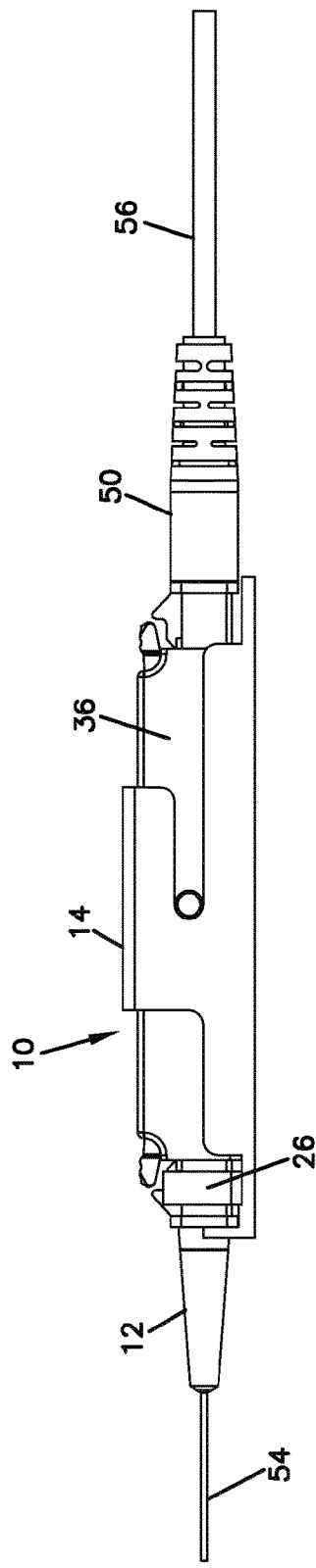
FIG. 15 is a side view of the view of FIG. 13.
Figure 16:
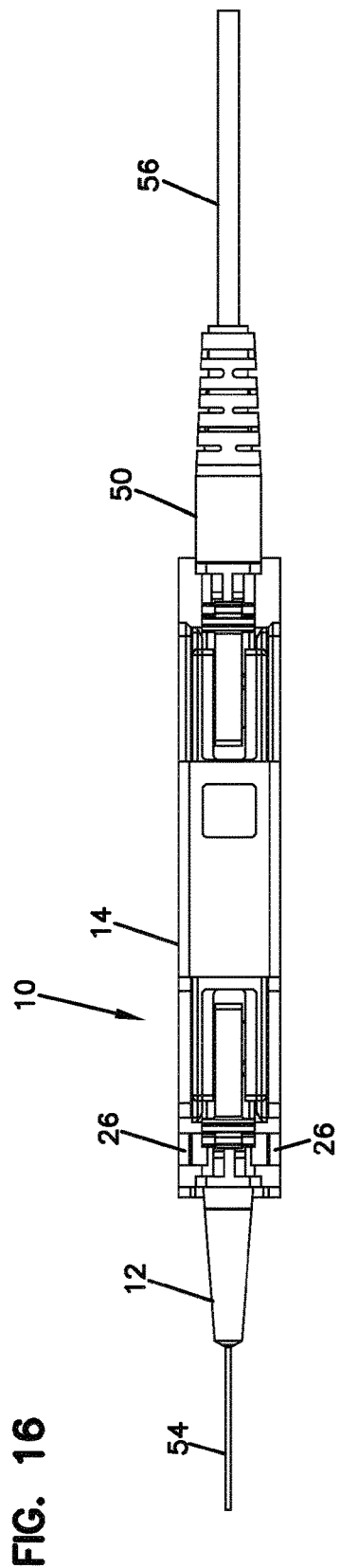
FIG. 16 is a top view of the view of FIG. 13.

Referring now to FIGS. 1-6, a connector holder system 10 is shown. System 10 includes a fiber optic connector holder 14 which holds a first fiber optic connector 12. System 10 maintains first connector 12 in a protected and organized manner for later connection to a second fiber optic connector. System 10 also does not require a fiber optic adapter for holding the first connector 12 before connection to the second connector. With system 10, a connector only approach is provided wherein only the one or more first connectors 12 are held and maintained ready for connection to an adapter and one or more second connector as desired by the user.

Holder 14 includes a base 16 and a housing 18. Housing 18 defines a pocket 20 for receipt of a distal end 22 of first connector 12. Pocket 20 also receives an adapter as will be described below. Holder 14 includes a clip 26 which clips to first connector 12 to hold first connector 12 to holder 14. As shown, clip 26 clips to a rear 24 of first connector 12. Clip 26 is located at end 30 of holder 14. Clip 26 is u-shaped and includes two clip arms 48.

As shown in FIGS. 7-12, an adapter 36 is inserted into an opposite end 32 of holder 14 for mating connection with first connector 12. Adapter 36 is inserted along a longitudinal axis 40 into pocket 20 and latches to first connector 12. Adapter 36 is not latched to holder 14 wherein movement in the axially direction would be prevented. Instead, axial movement is controlled by clip 26 mounted to first connector 12.

Adapter 36 includes posts 46 which slide along slots 28 of holder 14 to provide proper alignment with first connector 12. Pocket 20 does provide some support to adapter 36. The main fixation of the mating connectors and adapter is between first connector 12 and holder 14.

Once adapter 36 is mated with first connector 12, a second connector 50 is mated with adapter 36. See FIGS. 13-16. Once second connector 50 is mated with adapter 36, fiber optic signals can be transmitted between a first cable 54 and a second cable 56. Once both connectors are mated to adapter 36, the fiber optical fibers within each of the first and second connectors 12, 50 and cables 54, 56 are in optical alignment.

If desired, second connector 50 can be pre-mated with adapter 36, and then the combined adapter 36 and second connector 50 can be inserted into holder 14 for mating with first connector 12.

First connector 12 includes a shutter 34 for protecting the user and others before connection to the second connector 50. Second connector 50 also preferably includes a shutter.

Holder 14 includes an RFID tag location 42 for holding an RFID tag, if desired. Holder 14 can be provided with holes 44 (see FIGS. 5 and 6) to allow for RFID tags on the connectors to be read while positioned in holder 14. RFID tags allow for identification of specific connectors and adapters.

Holder 14 is shown with a closed housing 18 defining pocket 20. Housing 18 is optional if desired. An open topped base 16 can be provided.

Holder 14 can be used as a system demarcation location. In some implementations, first connectors 12 cannot be removed, if desired. Only adapters 36 and second connectors 50 would be accessible in that case. In such implementations, for example, the first fiber optic connector 12 might be held by a holder that is part of a fixture on a device such as a tray, panel, module, cassette, or chassis, wherein the first fiber optic connector 12 is positioned inside such a device without access to the first connector 12 from an exterior of the device. The present disclosure contemplates fiber optic connector holders that include release mechanisms for releasing the fiber optic adapter 36 and a second fiber optic connector 50 from a first fiber optic connector 12 when the first optic connector 12 may not be readily accessible to a user. Such holders will be discussed in further detail below. According to other aspects of the present disclosure, the release mechanism may be an integral part of the adapter that aligns the first and second fiber optic connectors 12, 50. Examples of such adapters will also be discussed in further detail below.

Figure 17:
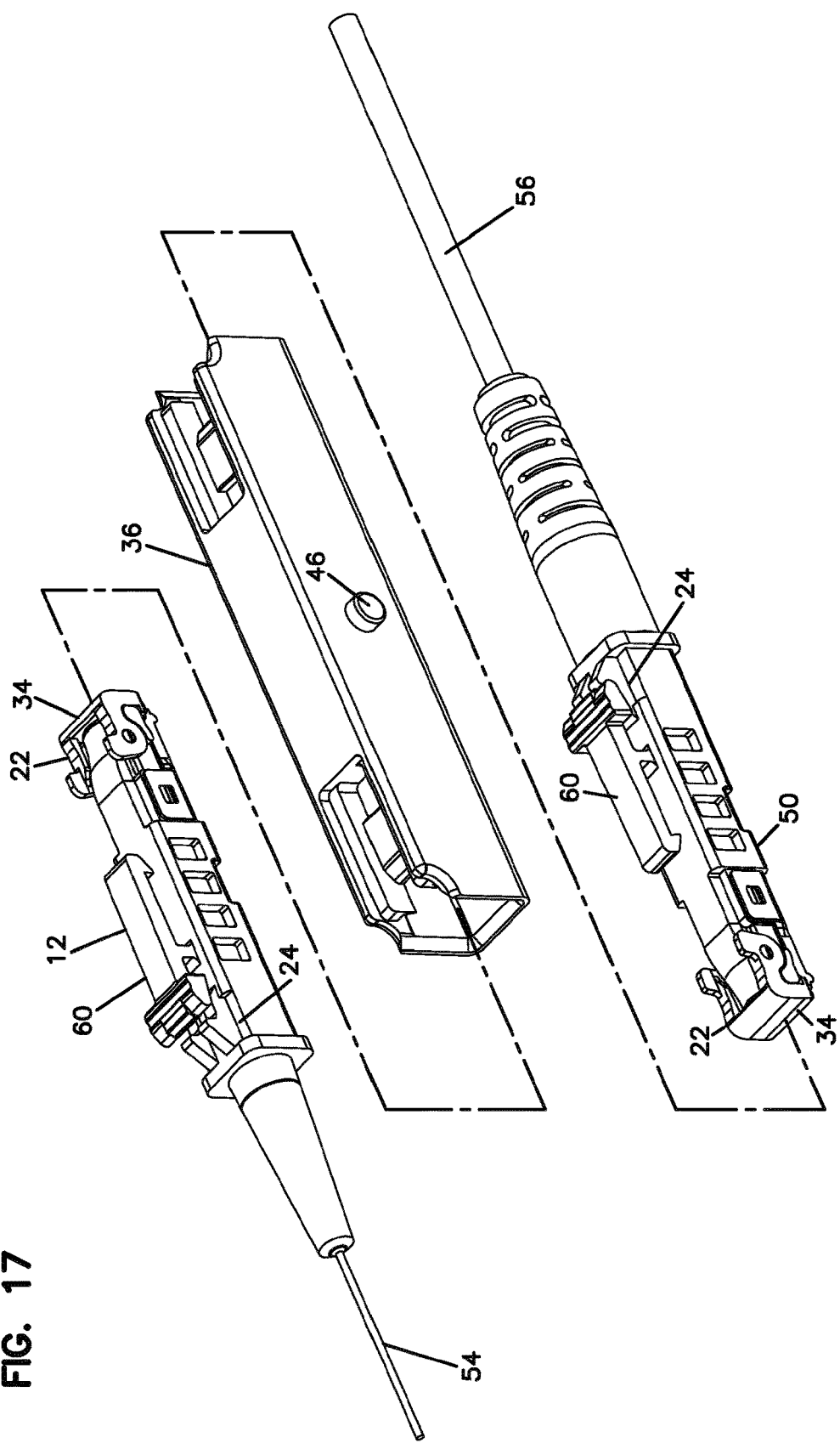
FIG. 17 is an exploded perspective view showing two fiber optic connectors separated from a mating fiber optic adapter.

Referring now to FIG. 17, adapter 36 is shown separated from first connector 12 and second connector 50. In use, connectors 12, 50 mount to adapter 36 with latches 60. During insertion of connectors 12, 50 into adapter 36, shutters 34 lift up exposing the optical fiber inside of connectors 12, 50. Further descriptions of the functions and structures of first connector 12 and second connector 50 and the mating adapter 36 are shown in U.S. Patent Application Ser. No. 61/758,021, entitled Optical Fiber Connection System Including Optical Fiber Alignment Device, filed Jan. 29, 2013, the disclosure of which is incorporated by reference in its entirety. Further embodiments of fiber optic adapters configured to mate first and second fiber optic connectors 12, 50 having features similar to those discussed herein are described and illustrated in U.S. Patent Application Ser. No. 61/831,392, entitled, Fiber Optic Adapter, filed Jun. 5, 2013, the disclosure of which is incorporated by reference in its entirety.

The types of first and second connectors 12, 50 and mating adapter 36 are shown in the drawings as one example implementation. It is to be appreciated that other format connectors and adapters could be used as desired wherein the connector (for example, LC, SC, MPO) is mounted to a holder configured to mount to the connector, instead of the adapter.

Figure 18:
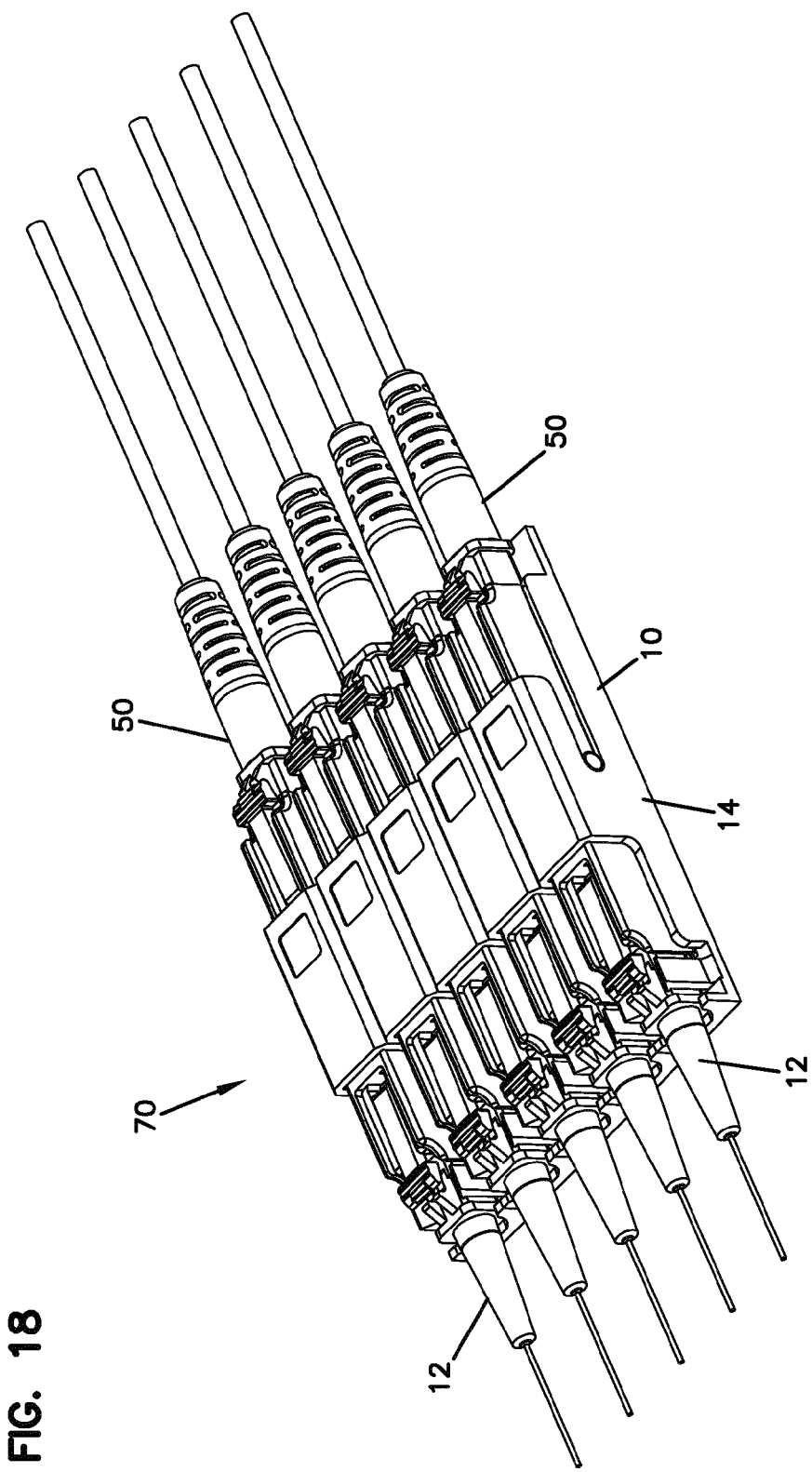
FIG. 18 shows a plurality of fiber optic connector holders mounted in a mounting arrangement for holding a plurality of first fiber optic connectors, mating fiber optic adapters, and second fiber optic connectors.
Figure 19:
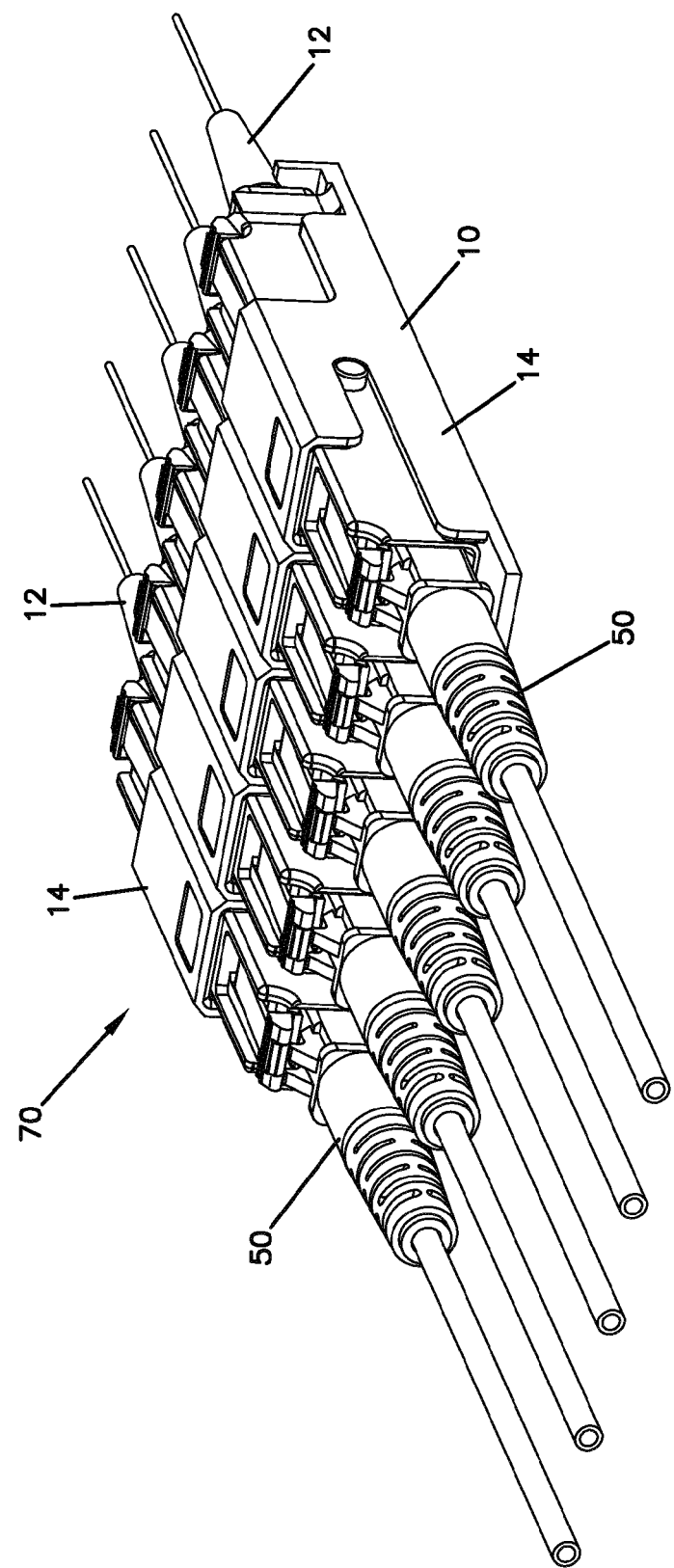
FIG. 19 is a further perspective view of the fiber optic connector holder mounting arrangement of FIG. 18.
Figure 20:
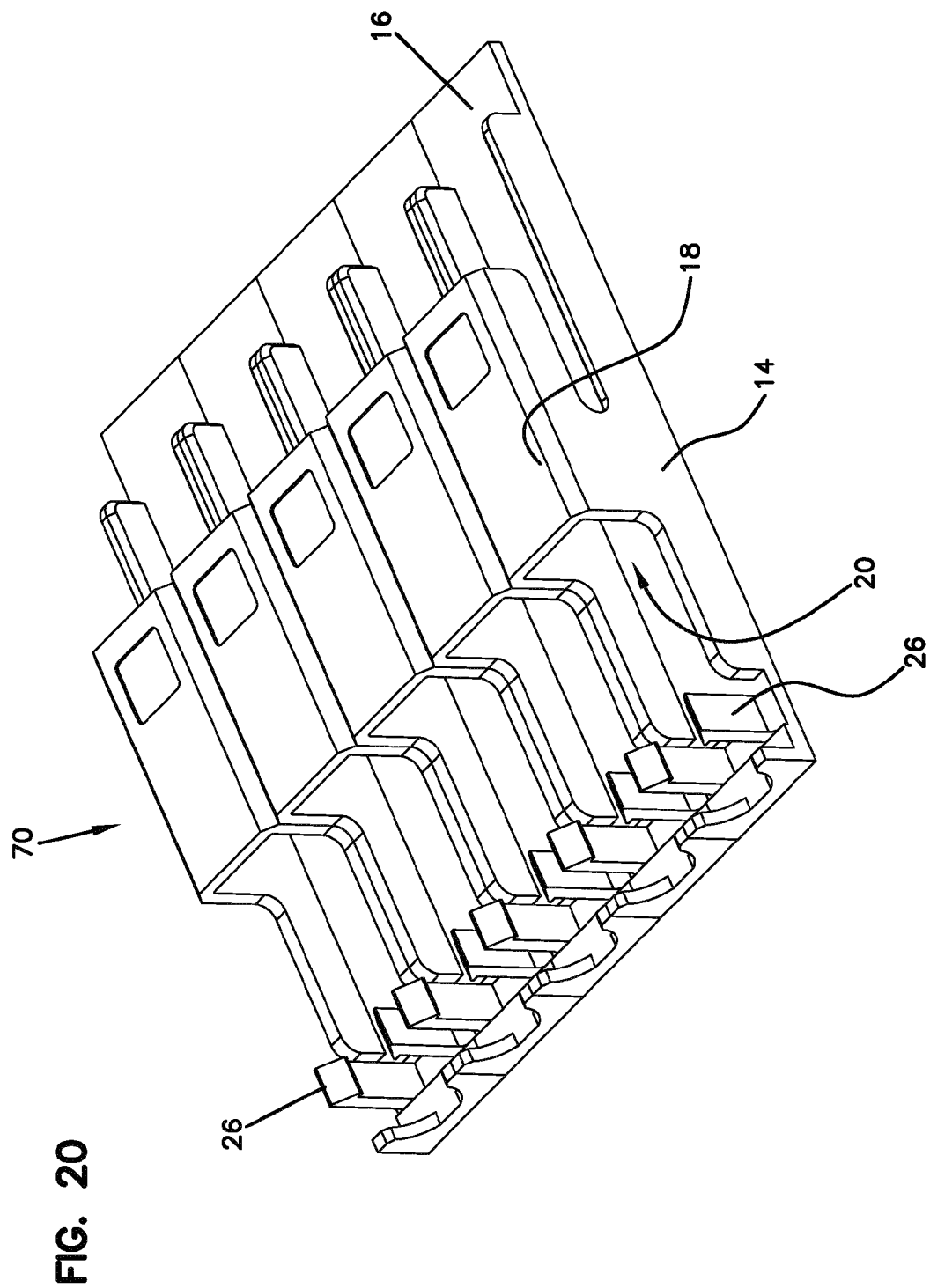
FIG. 20 is a perspective view of the fiber optic connector holder mounting arrangement without the connectors or adapters shown.

Referring now to FIGS. 18-20, a mounting arrangement or fixture 70 is shown with a plurality of holders 14. Holders 14 can be separate elements held together with a mounting structure, or mounting arrangement or fixture 70 can be made with integrally formed holders 14.

A single holder 14 or a plurality of holders 14, such as mounting arrangement or fixture 70, can be mounted to a tray, a panel, a module, a cassette, a chassis, or other telecommunications equipment, as desired. In the example implementation, clip 26 is releasable for removing first connector 12. Other mounting structures can be used instead of clip 26 to mount first connector 12 to holder 14.

FIGS. 21-24 show various implementations of mounting arrangements 70 including a plurality of holders 14, either separately mounted, or integrally formed therewith for holding a plurality of connectors prior to connections with an adapter and a second connector. The mounting arrangements 70 can be moveably mounted for improved user access too, as desired.

Figure 21:
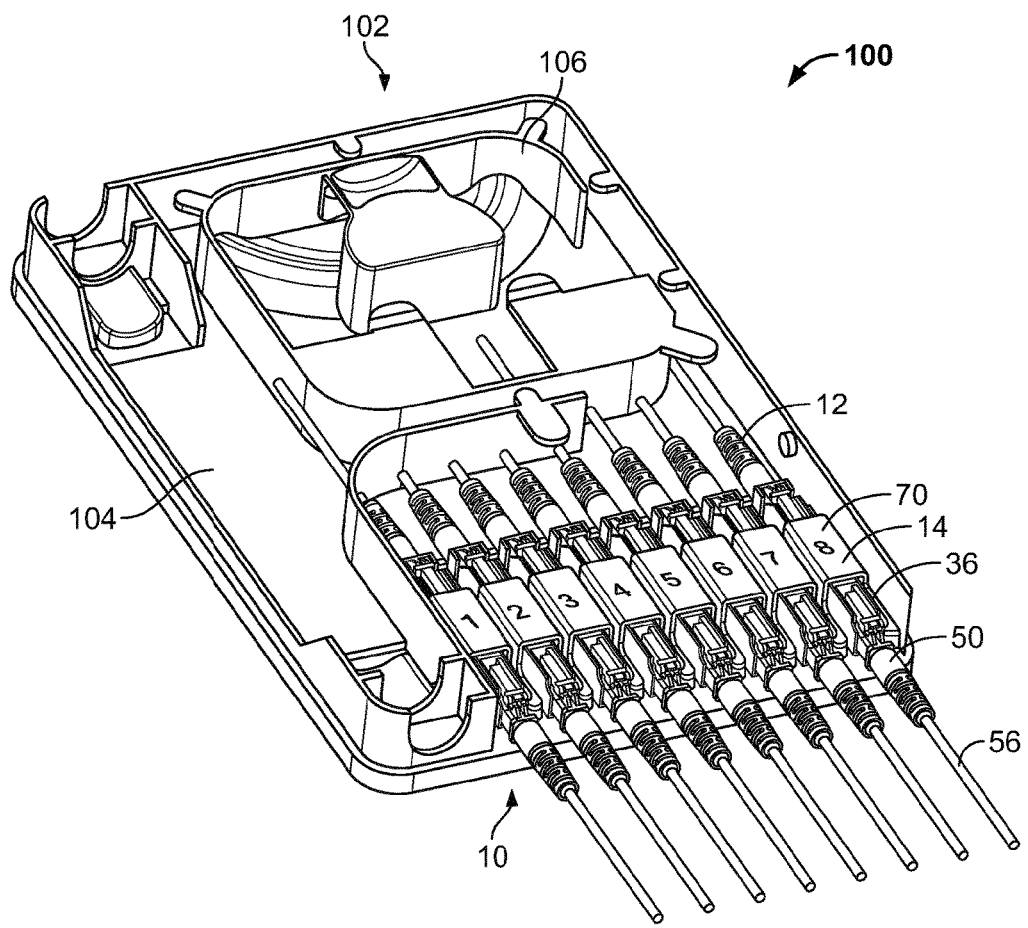
FIG. 21 is an example implementation of a connector holder system utilizing the connector holder implementations of FIGS. 1-20.

Referring now to FIG. 21, a first tray 100 is shown including a mounting arrangement 70 in the form of a single row of fiber optic connector holders 14. First tray 100 can include other cable management structures 102 such as a cable pass through 104 and a cable storage area 106.

Figure 22:
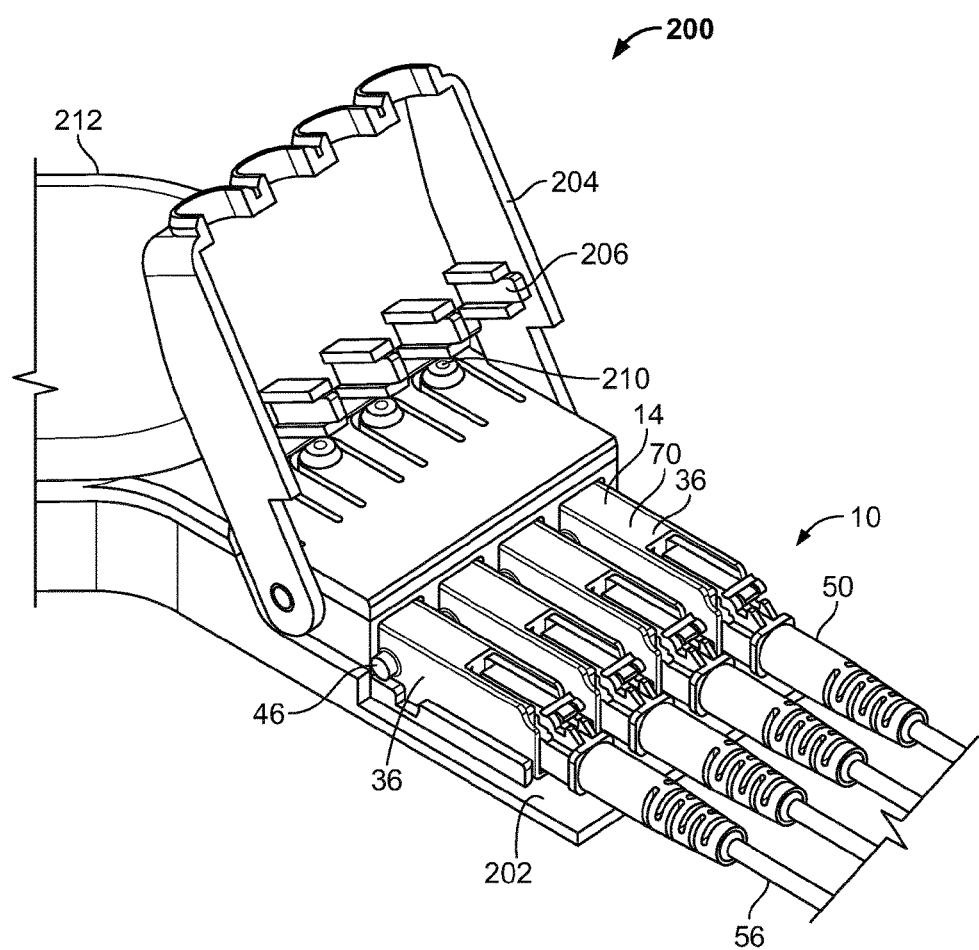
FIG. 22 is another example implementation of a connector holder system utilizing the connector holder implementations of FIGS. 1-20.

Referring now to FIG. 22, a second tray 200 is shown with a mounting arrangement or fixture 70 in the form of a single row of fiber optic connector holders 14. Second tray 200 includes a tray base 202 and a pivotable cover 204. Posts 46 on adapters 36 are held in slots 206 when cover 204 is closed. Fixation is by the first connectors 12 (not shown) within the interior second tray 200. Slots 206 provide an additional load bearing structure in situations where an extra load may be placed on second connectors 50 and cables 56. However, the engagement of posts 46 and slots 206 does not interfere with the fiber optic signal pathway alignment between the first and second connectors 12, 50, since the primary fixation is by tray 200, holders 14 and first connectors 12 inside of tray 200. Posts 46 allow for rotation of adapter 36 to help avoid stress on the fiber to fiber alignment. Adapters 36 can be removed from the interiorly located first connectors 12 by engagement with buttons 210. Button 210 engages the connector latch 60 on first connector 12 disposed within the closed interior of a rear portion 212 of second tray 200.

Figure 23:
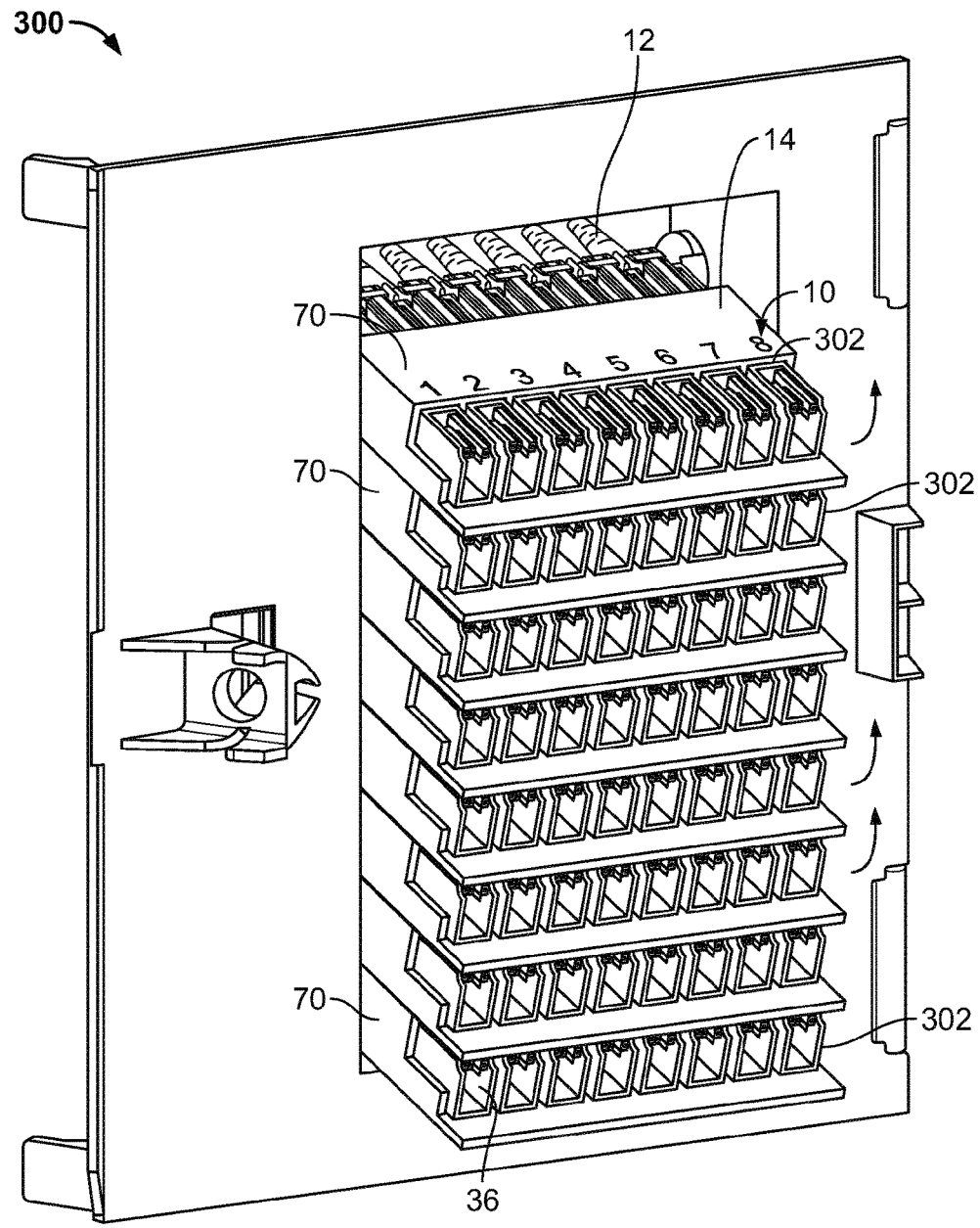
FIG. 23 is a further example implementation of a connector holder system utilizing the connector holder implementations of FIGS. 1-20.

Referring now to FIG. 23, a panel 300 is shown including a plurality of rows 302 of holders 14. Holders 14 are provided in mounting arrangements 70 which are pivotable up and down relative to one another to allow for connector access. Such pivoting will also allow for improved access to individual RFID tags associated with the adapters 36, and the related connectors 12, 50.

Figure 24:
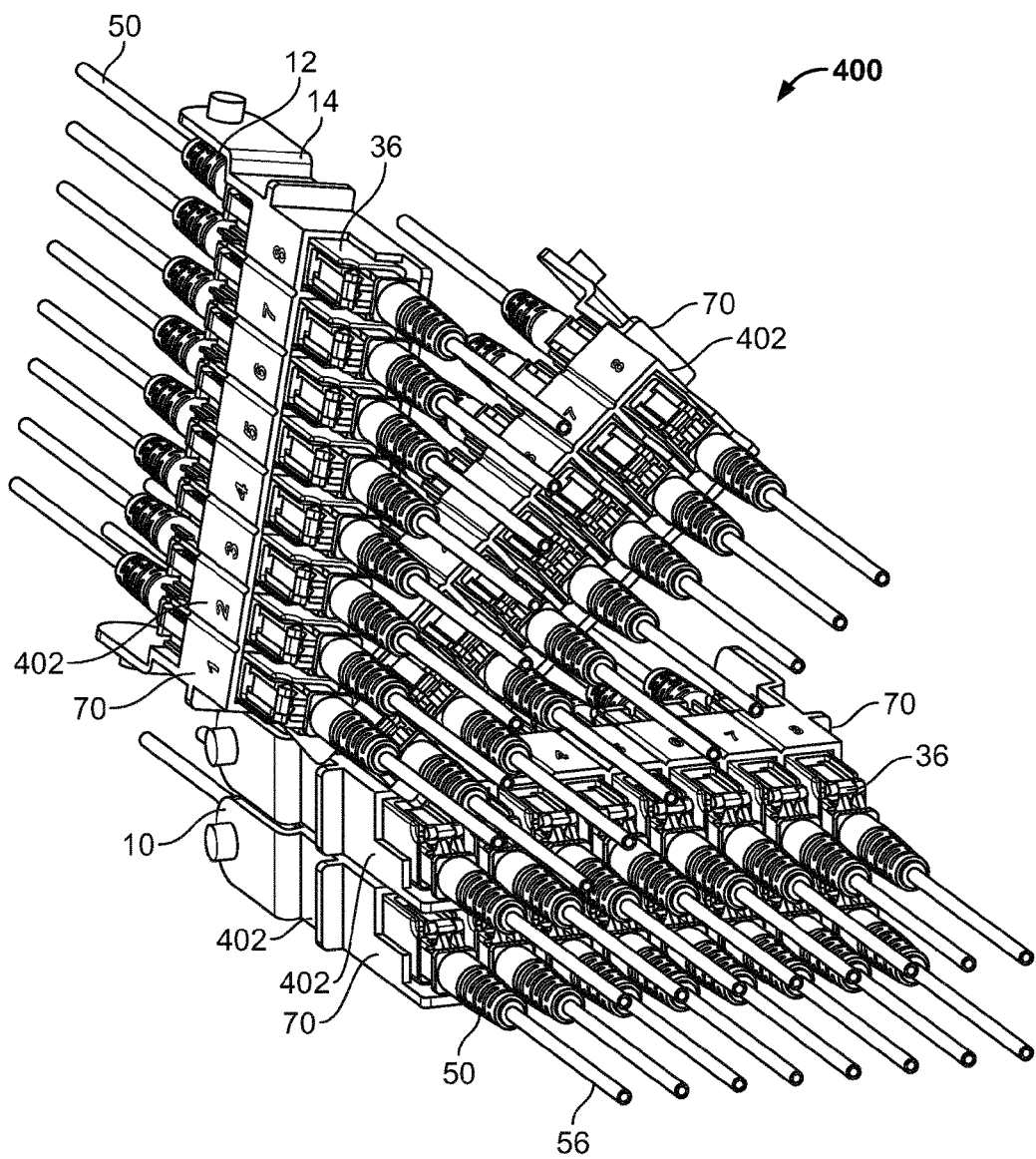
FIG. 24 is a further example implementation of a connector holder system utilizing the connector holder implementations of FIGS. 1-20.
Figure 25:
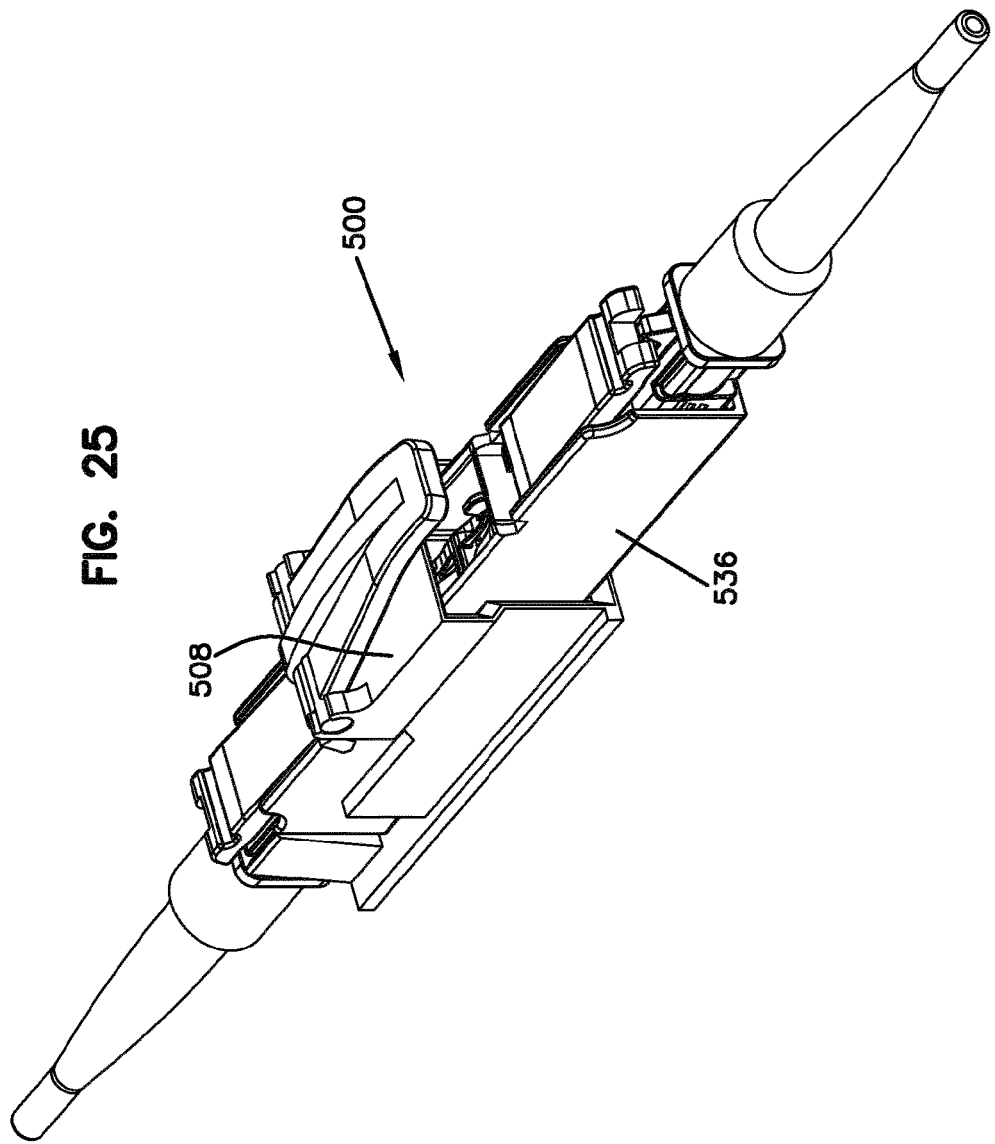
FIG. 25 is a front perspective view of another embodiment of a fiber optic connector holder system having features that are examples of inventive aspects in accordance with the present disclosure.
Figure 26:
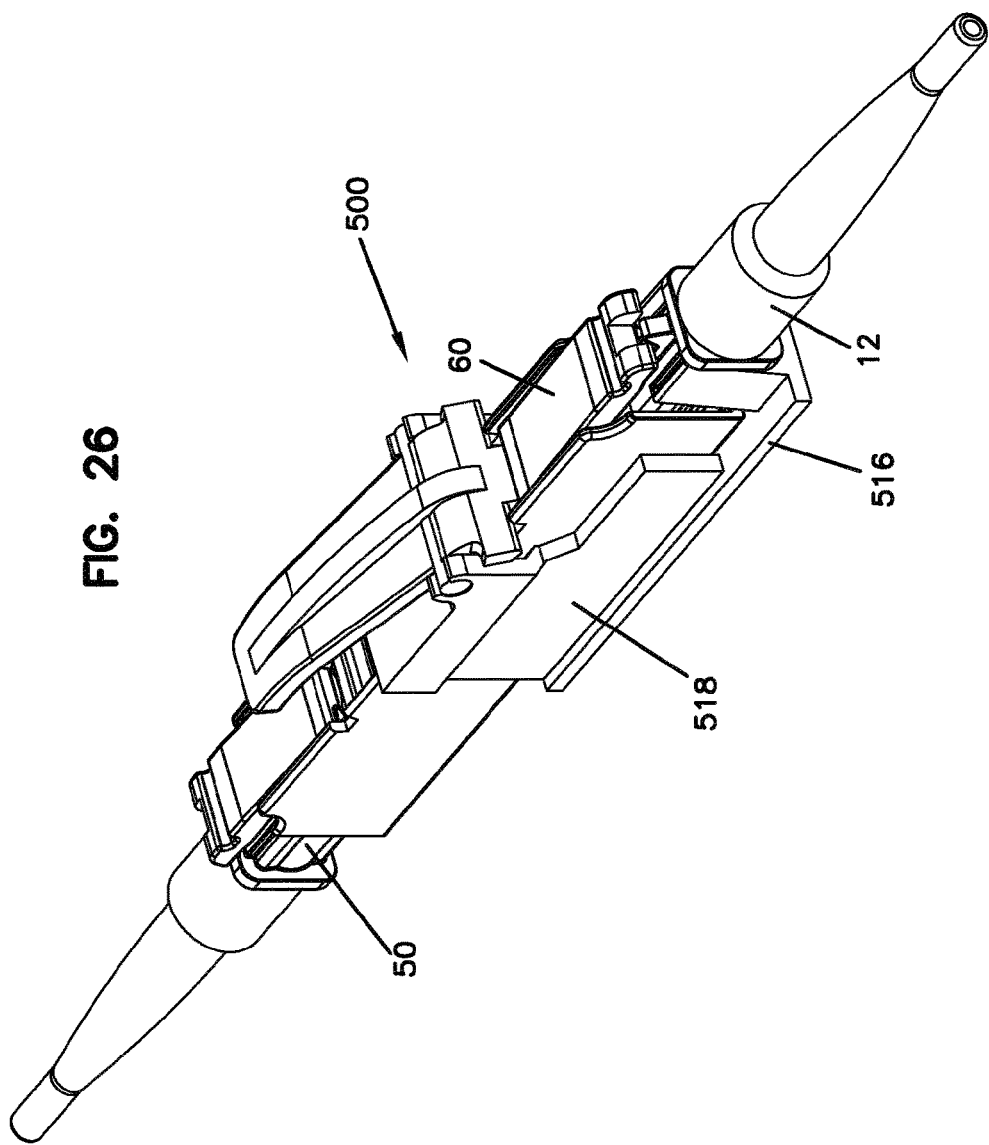
FIG. 26 is a rear perspective view of the system of FIG. 25.
Figure 27:
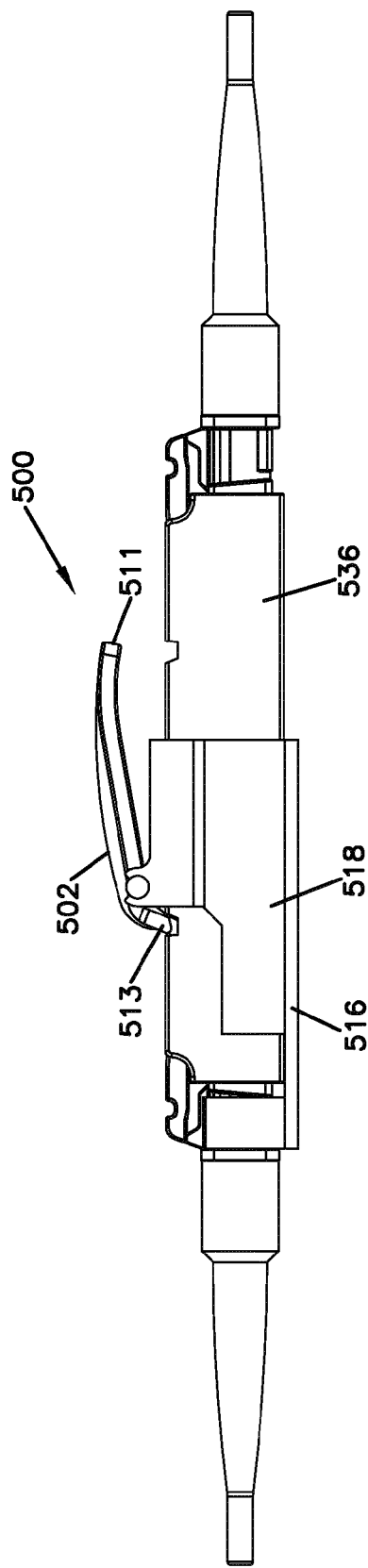
FIG. 27 is a side view of the system of FIG. 25.
Figure 28:
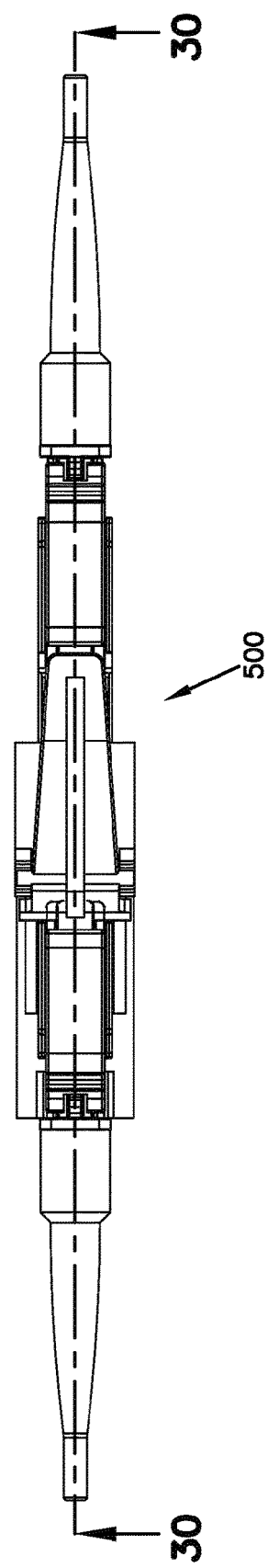
FIG. 28 is a top view of the system of FIG. 25.
Figure 29:
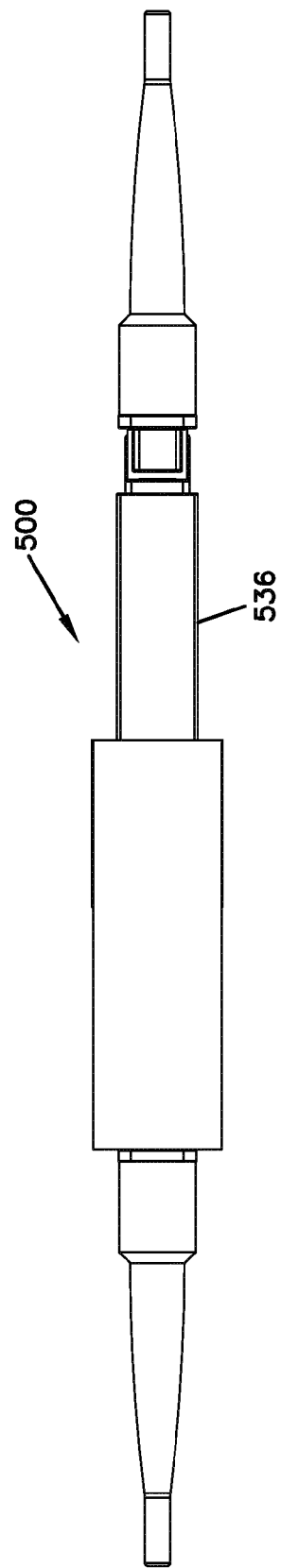
FIG. 29 is a bottom view of the system of FIG. 25.
Figure 30:
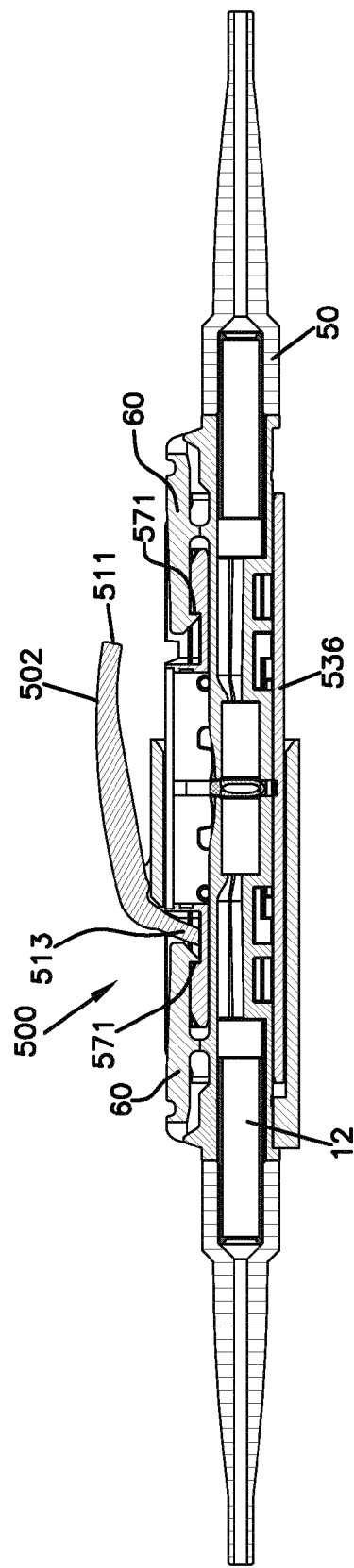
FIG. 30 is a cross-sectional view taken along line 30-30 of FIG. 28.
Figure 31:
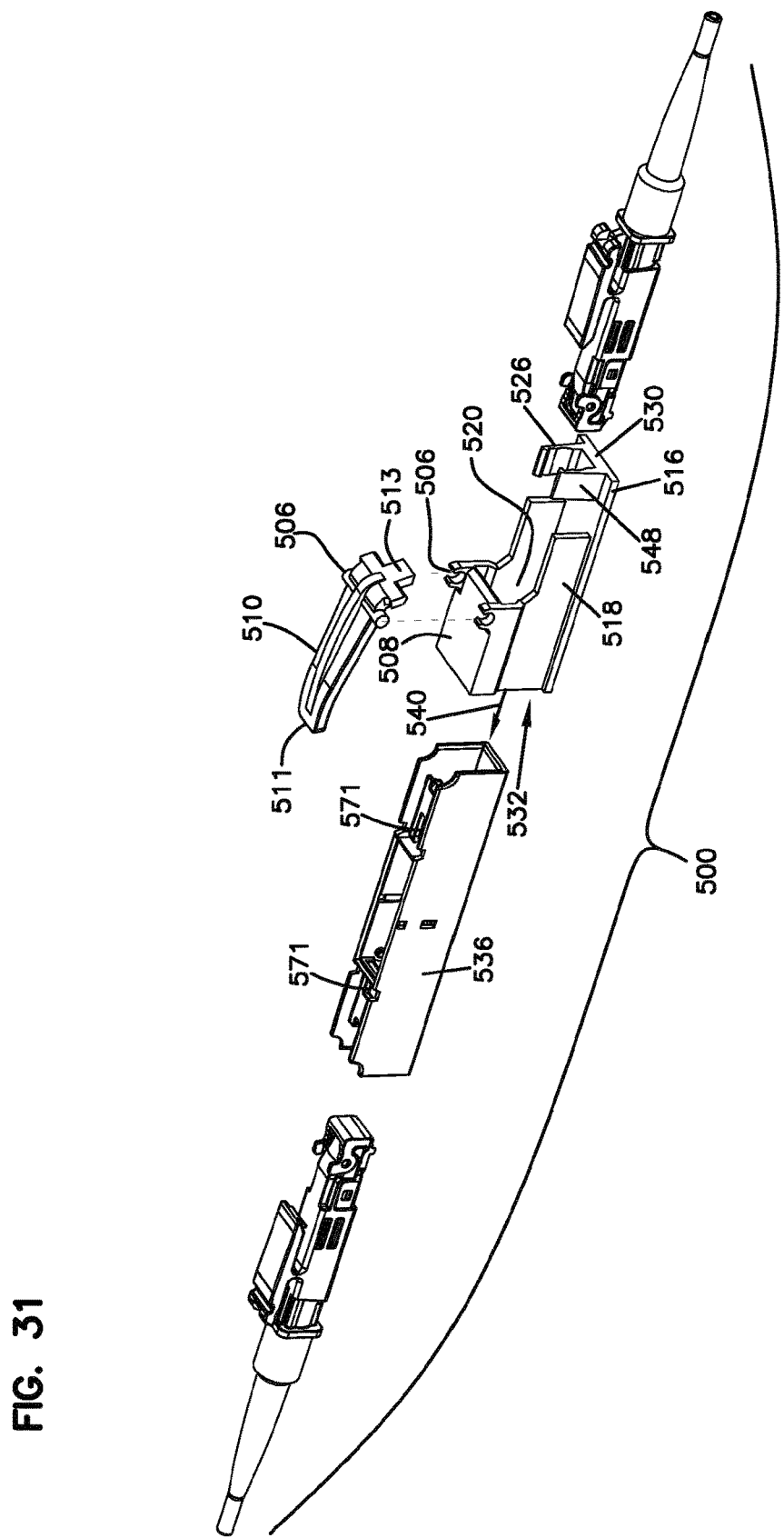
FIG. 31 is an exploded view of the system of FIG. 25.
Figure 32:
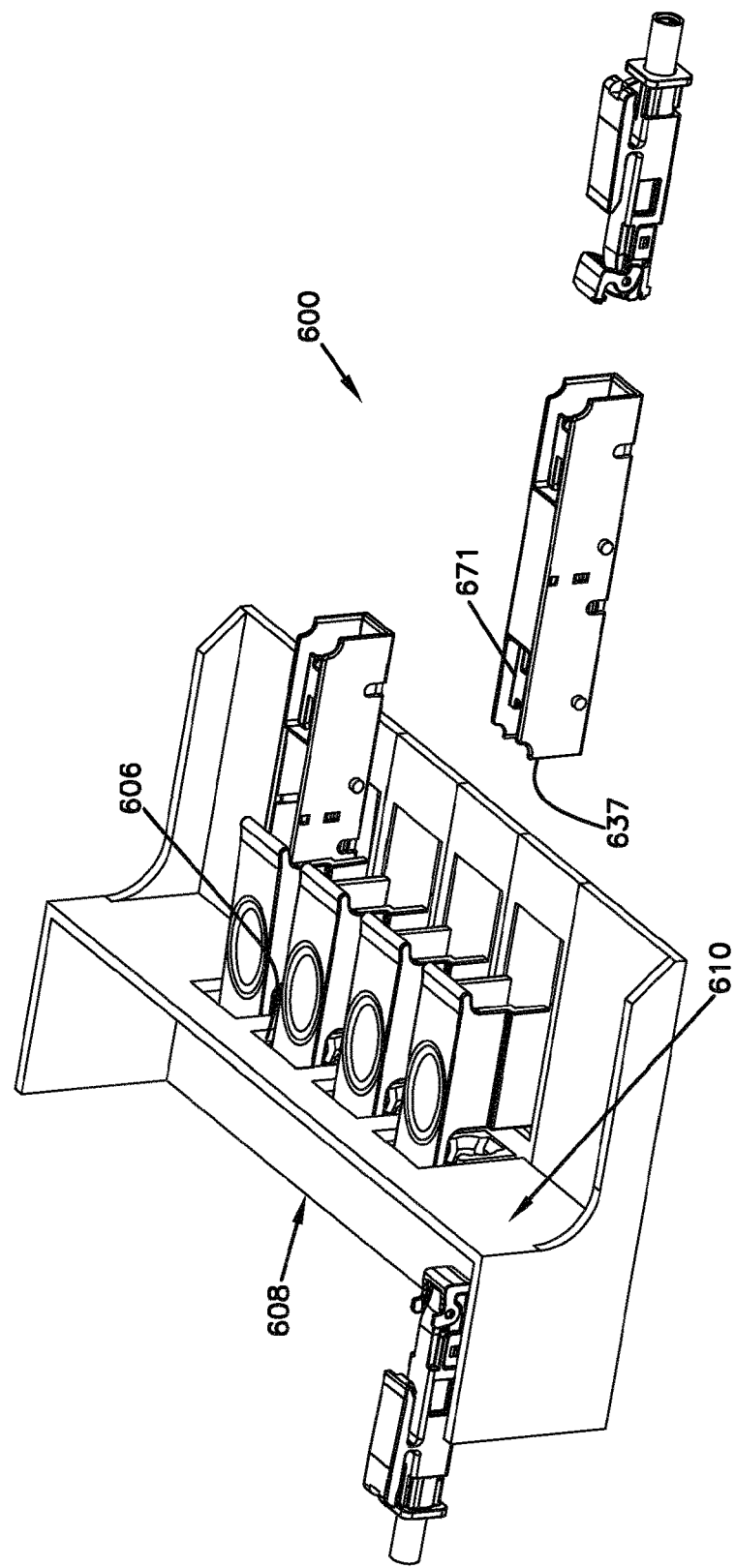
FIG. 32 is a left side perspective view of another embodiment of a fiber optic connector holder system having features that are examples of inventive aspects in accordance with the present disclosure.
Figure 33:
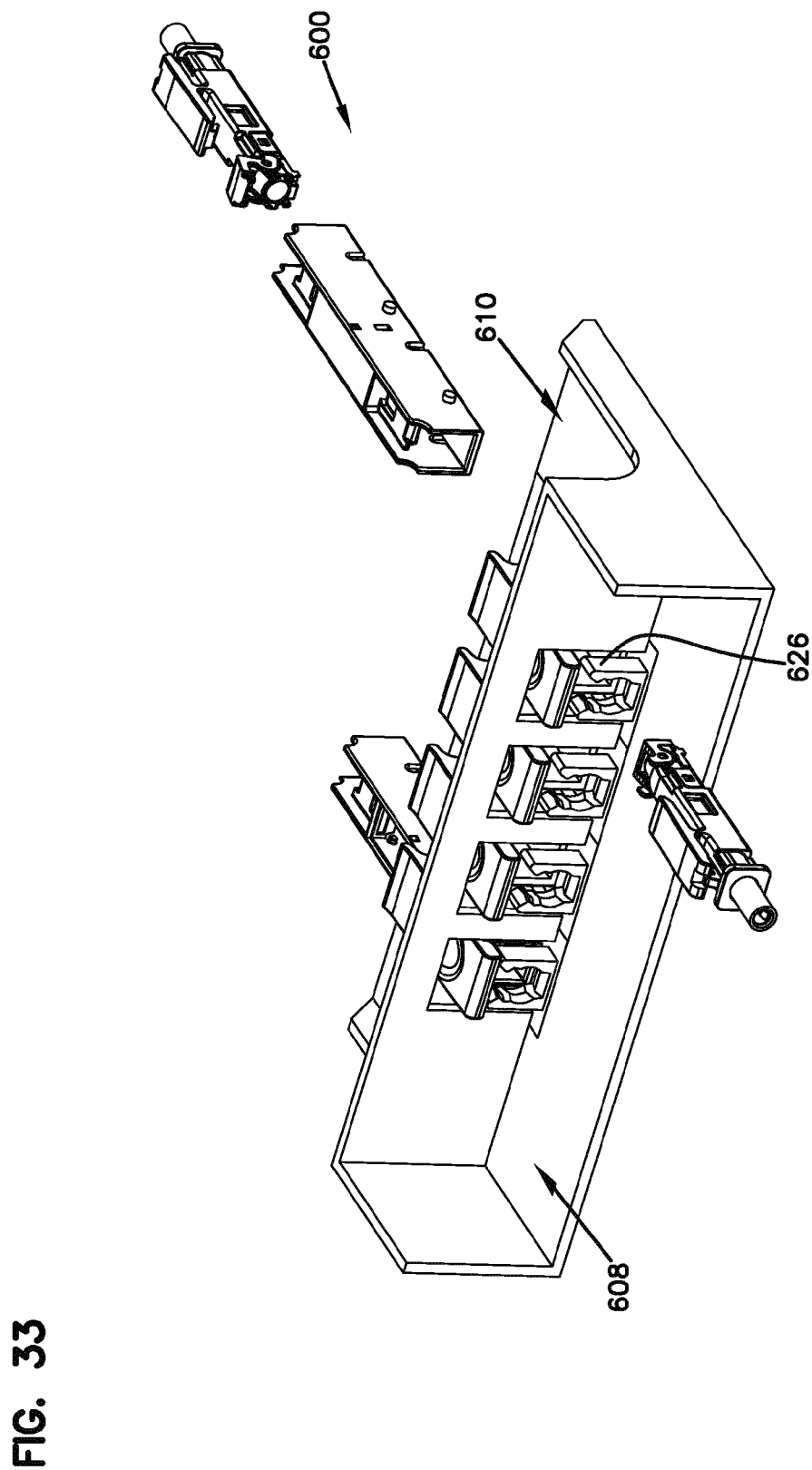
FIG. 33 is a rear perspective view of the system of FIG. 32.

Referring now to FIG. 24, another fixture in the form of a mounting block 400 is shown with a plurality of rows 402 of holders 14. As with panel 300, mounting block 400 also includes a dense arrangement of the adapters 36 and the first and second connectors 12, 50 in mounting arrangement 70. Rows 402 pivot about an axis which is parallel to the connector axis for each of the connectors for improved access to the adapters 36 and connectors 12, 50.

Connector holder system 10 and the various implementations noted above holds the connector of one of the mated connector pairs, instead of the mating adapter 36. In general, it is not desirable to precisely fix to a holder, tray, or other device both of the mating connectors and the mating adapter. Tolerance offsets, and misalignments may interfere with proper fiber alignment and signal transmission. In the present implementations, the connector 12 is the primary fixation of the system 10. If there is additional fixation provided, such as for load bearing situations, it does not interfere with the connector 12 to holder 14 fixation, or the fiber to fiber alignment.

One result of providing a connector holder system 10 as described herein is that the adapters 36 can be added at a later date, when desired. In the implementations shown above, the connector 12 is protected without the need for an adapter.

As noted above, in certain implementations, the first fiber optic connector 12 might be held by a holder that is part of a fixture on a device such as a tray, panel, module, cassette, or chassis, wherein the first fiber optic connector 12 is positioned inside such a device without access to the first connector 12 from an exterior of the device. The present disclosure contemplates fiber optic connector holders that might include release mechanisms for releasing the fiber optic adapter and a second fiber optic connector 50 from a first fiber optic connector 12 when the first optic connector 12 may not be readily accessible to a user. When a connector 12 is protected within a device without the need for an adapter, the adapter and the second connector 50 may be added at a later date. However, removability of the adapter and the second connector 50 without having to access or interfering with the first connector 12 is important in such a connector-only approach wherein only the one or more first connectors 12 are held and maintained ready for connection to an adapter and one or more second connectors 50 as desired by the user.

Referring now to FIGS. 25-31, another embodiment of a connector holder system 500 is illustrated. The holder system 500 includes a connector holder 514 that includes a release mechanism 502 for releasing a fiber optic adapter 536 and a second fiber optic connector 50 from a first fiber optic connector 12 when the first fiber optic connector 12 may not be readily accessible to a user such as, for example, when the holder 514 may be part of a fixture on a device such as a tray, panel, module, cassette, or chassis, wherein the first fiber optic connector 12 is positioned inside such a device without access to the first connector 12 from an exterior of the device.

Still referring to FIGS. 25-31, the holder 514 of the system 500 includes a base 516 and a housing 518. Housing 518 defines a pocket 520 for receipt of a distal end 22 of first connector 12. Pocket 520 also receives the adapter 536. Holder 514 includes a clip 526 which clips to first connector 12 to hold first connector 12 to holder 514. As shown, clip 526 clips to a rear 24 of first connector 12. Clip 526 is located at end 530 of holder 514. The depicted clip 526 is u-shaped and includes two clip arms 548. Other variations in structures for fixedly holding the connector 12 are also possible.

As shown in FIGS. 25-31, the adapter 536 is inserted into an opposite end 532 of holder 514 for mating connection with first connector 12. Adapter 536 is inserted along a longitudinal axis 540 into pocket 520 and latches to first connector 12. Adapter 536 is not latched to holder 514 wherein movement in the axially direction would be prevented. Instead, axial movement is controlled by clip 526 mounted to first connector 12. As discussed for previous embodiments, pocket 520 does provide some support to adapter 536. The main fixation of the mating connectors and adapter 536, however, is between first connector 12 and holder 514.

Once adapter 536 is mated with first connector 12, a second connector 50 is mated with adapter 536. Once second connector 50 is mated with adapter 536, fiber optic signals can be transmitted between a first cable and a second cable. Once both connectors 12, 50 are mated to adapter 536, the optical fibers within each of the first and second connectors 12, 50 and first and second cables are in optical alignment.

If desired, second connector 50 can be pre-mated with adapter 536, and then the combined adapter 536 and second connector 50 can be inserted into holder 514 for mating with first connector 12.

In the embodiment shown, the holder 514 includes the release mechanism 502 that allows a user to release the fiber optic adapter 536 and the second fiber optic connector 50 from the first fiber optic connector 12 when the first optic connector 12 may not be readily accessible to a user such as, for example, when the holder 514 may be part of a fixture on a device such as a tray, panel, module, cassette, or chassis, wherein the first fiber optic connector 12 is positioned inside such a device without access to the first connector 12 from an exterior of the device. The release mechanism 502 is defined by a lever arm 510 pivotally attached via a hinge 506 at a top 508 of the holder housing 518.

The lever arm 510 defines a first end 511 and a second end 513. The first end 511 is configured to be pressed down by a user and is positioned so as to be accessible to a user from an exterior of a device if, for example, the holder is forming a part of the device that limits access to the first connector 12.

The second end 513 of the lever arm 510 is configured as a release end. When the lever arm 510 is operated, the release end 513 abuts and lifts up the latch 60 of the first fiber optic connector 12 and frees the latch 60 from a catch 571 of the adapter 536. Thus, when the lever arm 510 is pivotally moved, the adapter 536 and the second connector 50 that is latched thereto can be slidably removed from holder 514. Since the only connection that is preventing axial movement of the adapter 536 and the second connector 50 relative to the holder 514 is the latched connection of the first connector 12 that is held by the clip 526, freeing the adapter 536 from the first connector 12 allows release of the adapter 536 and the second connector 50 from the holder 514.

In this manner, as discussed, when the first fiber optic connector 12 is not readily accessible to a user such as, for example, when the holder 514 may be part of a fixture on a device such as a tray, panel, module, cassette, or chassis, wherein the first fiber optic connector 12 is positioned inside such a device without access to the first connector 12 from an exterior of the device, the release mechanism 502 can be used to release the adapter 536 and the second connector 50 without disturbing the first connector 12.

During initial insertion or re-insertion of the adapter 536 into the holder 514 to mate with the first connector 12, the release end 513 of the lever arm 510 simply pivots upwardly and out of the way due to abutment with the adapter 536 to allow the latch 60 of the first connector to engage with the catch 571 of the adapter 536.

FIGS. 32-46 illustrate another embodiment of a connector holder system 600, wherein the holder 614 of the system 600 includes a release mechanism 602 for releasing a fiber optic adapter 636 and a second fiber optic connector 50 from a first fiber optic connector 12 when the first optic connector 12 may not be readily accessible to a user.

Figure 46:
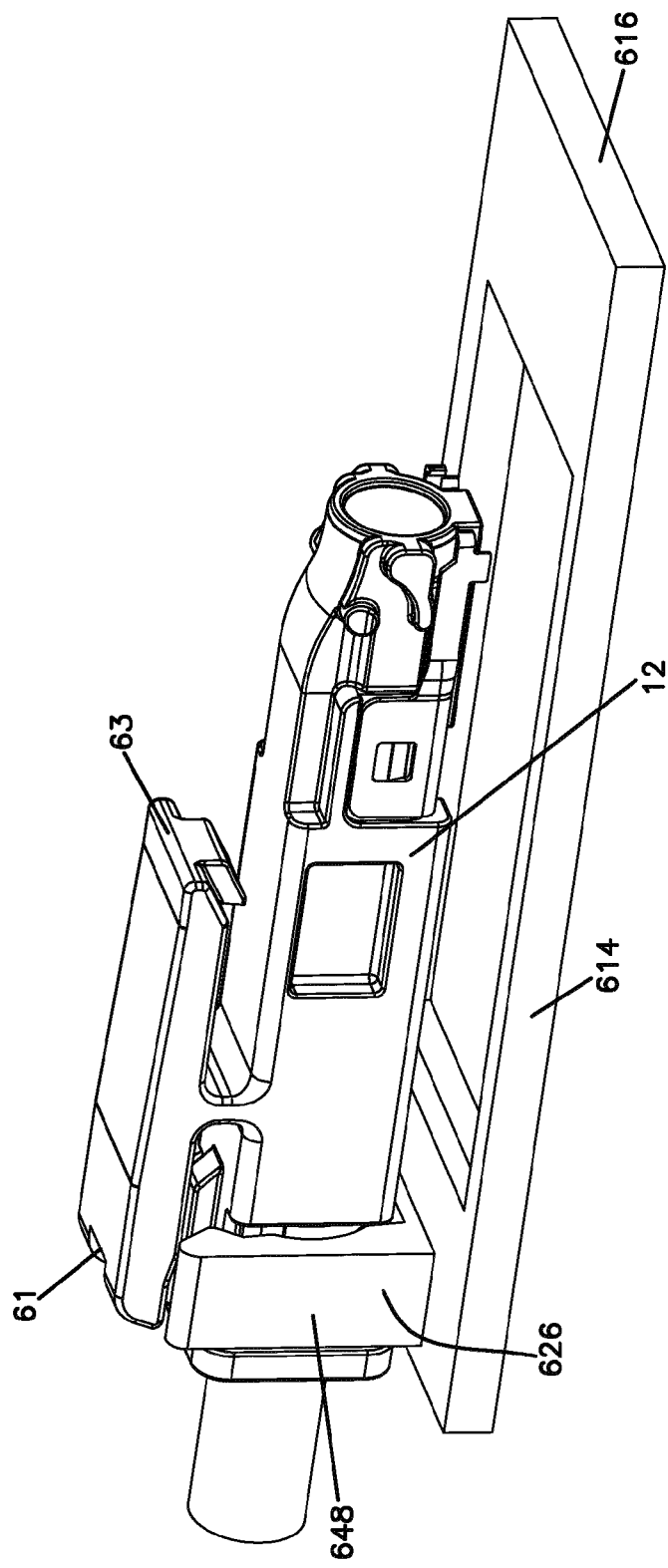
FIG. 46 illustrates a portion of the holder of FIGS. 42-45 with a fiber optic connector mounted to the clip of the holder.
Figure 47:
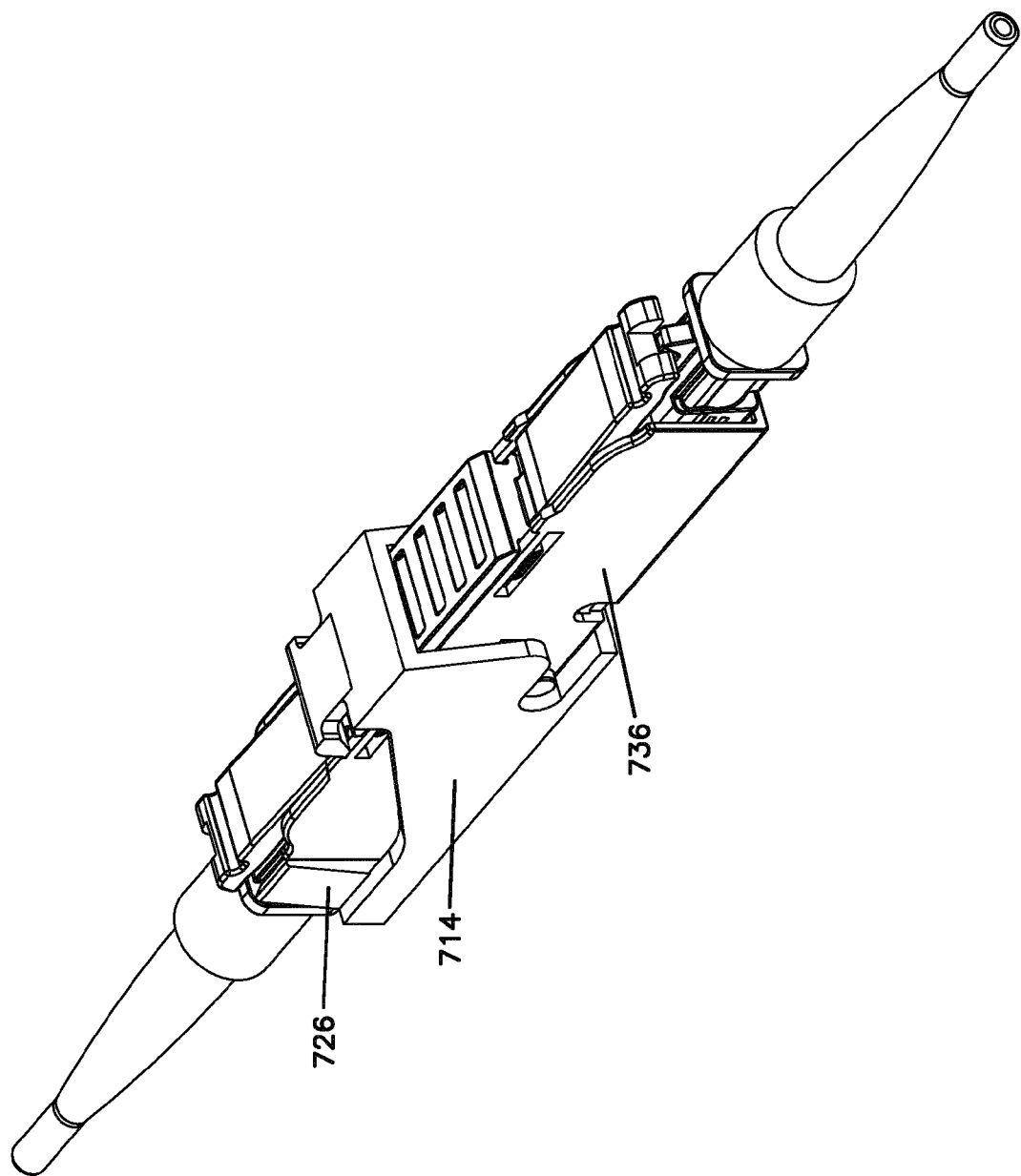
FIG. 47 is a front perspective view of another embodiment of a fiber optic connector holder system having features that are examples of inventive aspects in accordance with the present disclosure.
Figure 48:
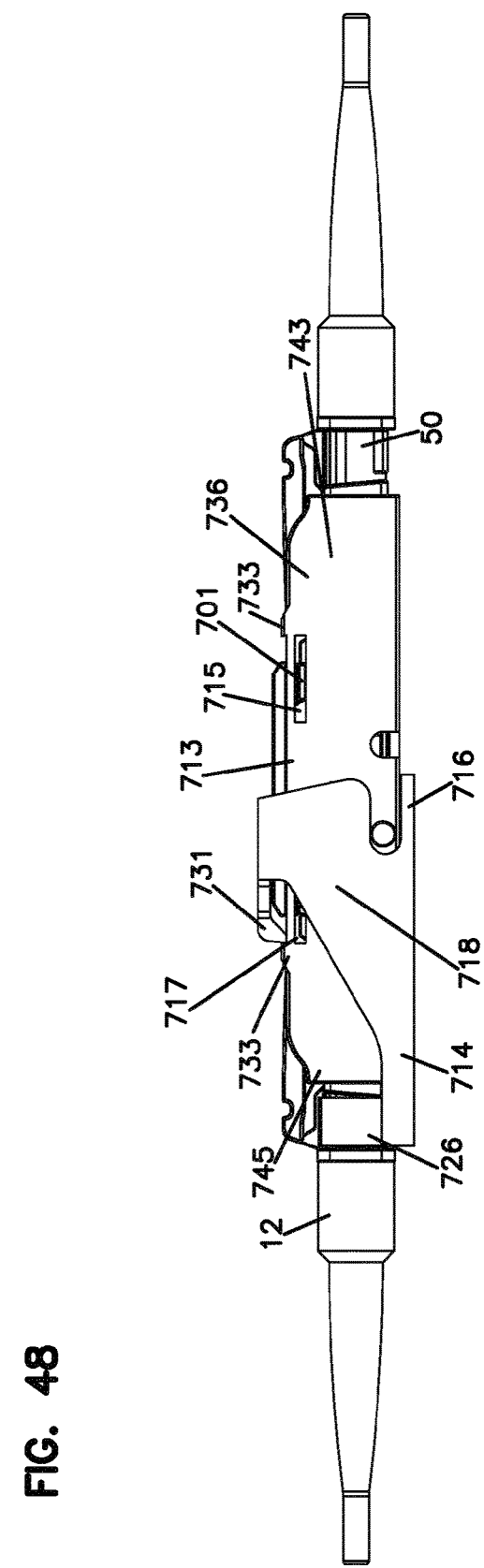
FIG. 48 is a side view of the holder system of FIG. 47.
Figure 49:
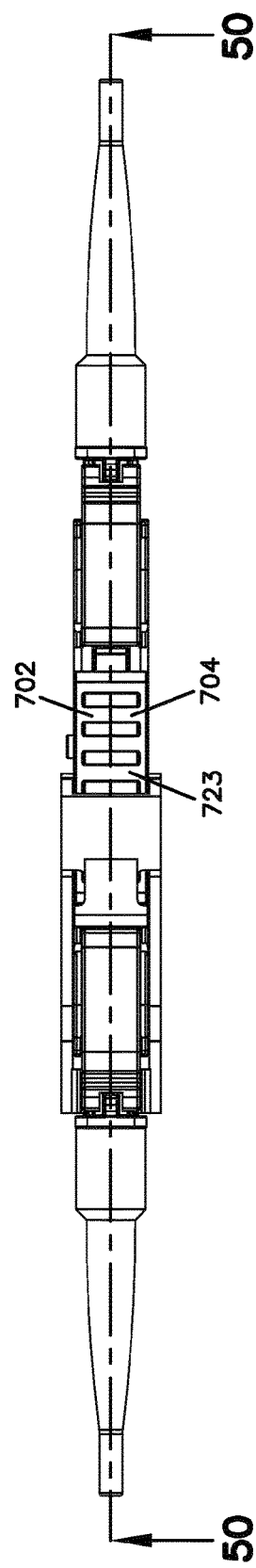
FIG. 49 is a top view of the holder system of FIG. 47.
Figure 50:
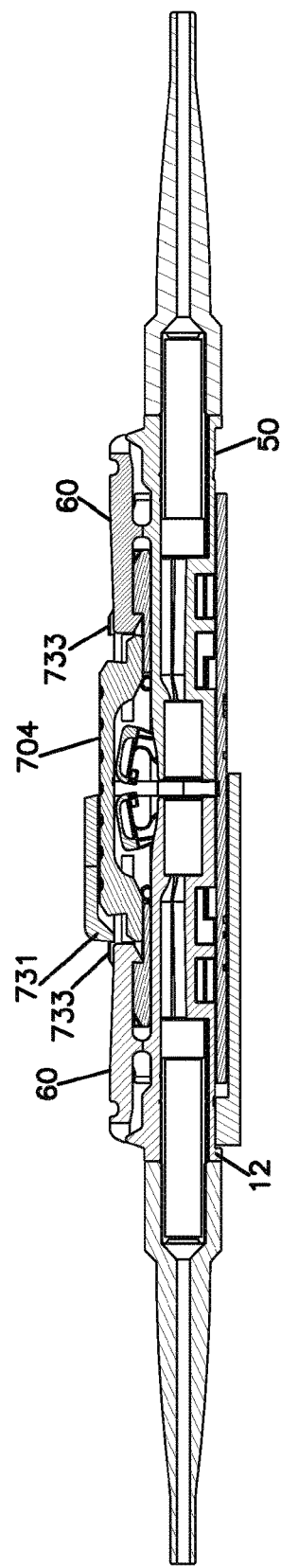
FIG. 50 is a cross-sectional view taken along line 50-50 of FIG. 49.
Figure 51:
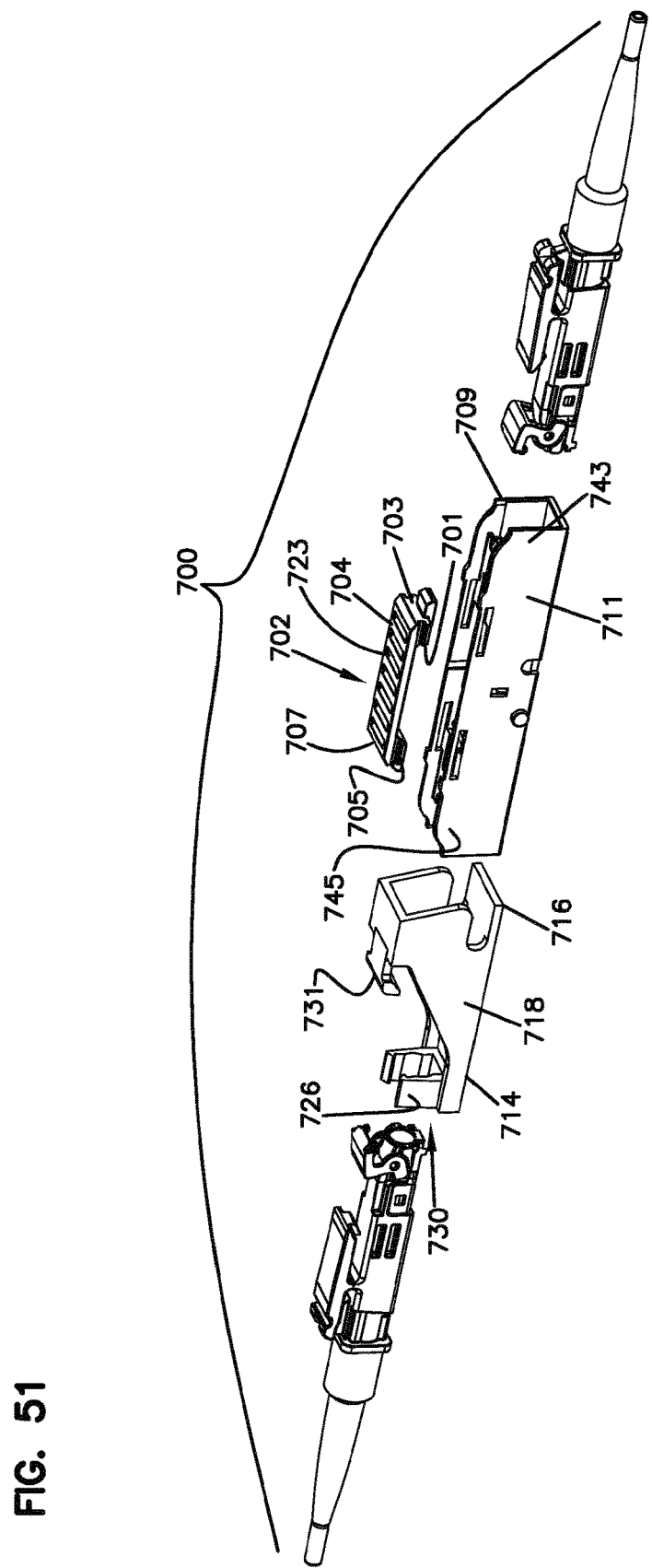
FIG. 51 illustrates the holder system of FIGS. 47-50 in an exploded configuration.
Figure 53:
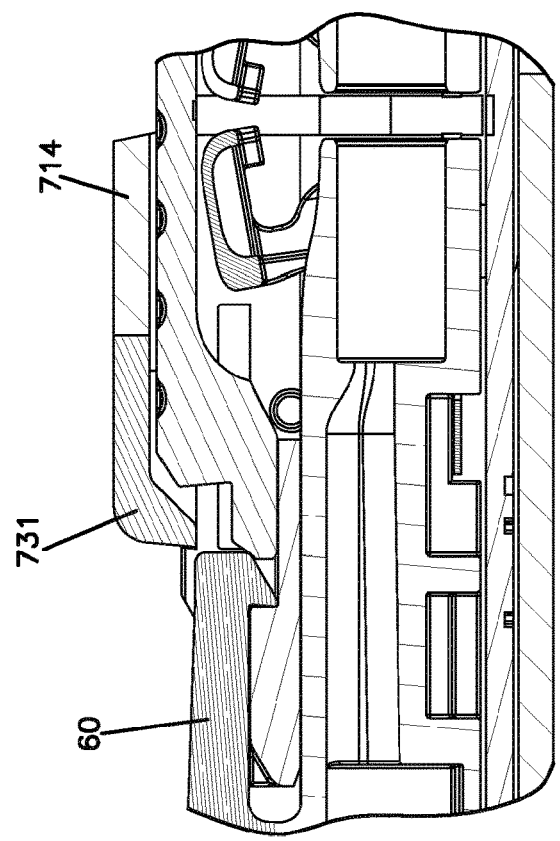
Figure 52:
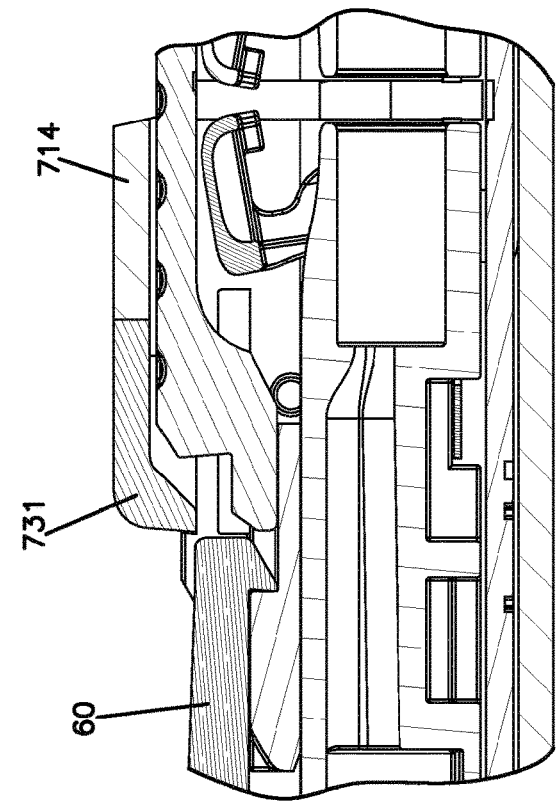
Figure 55:
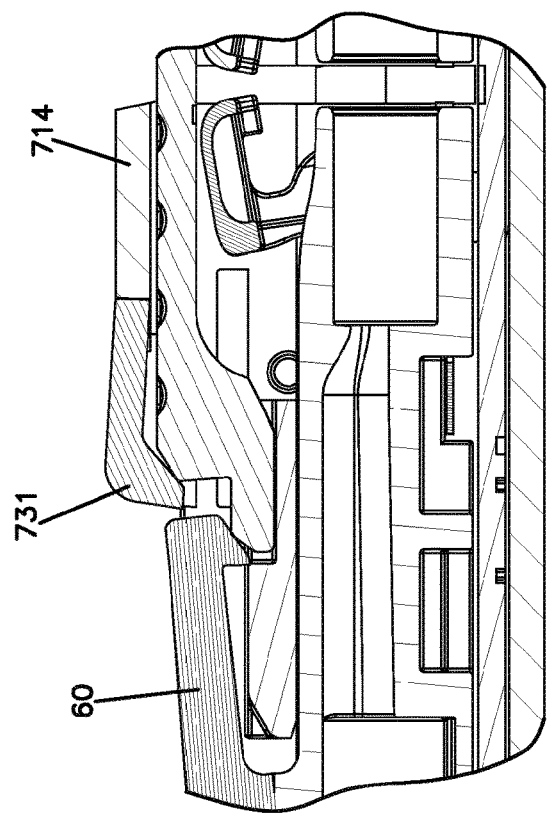
Figure 54:
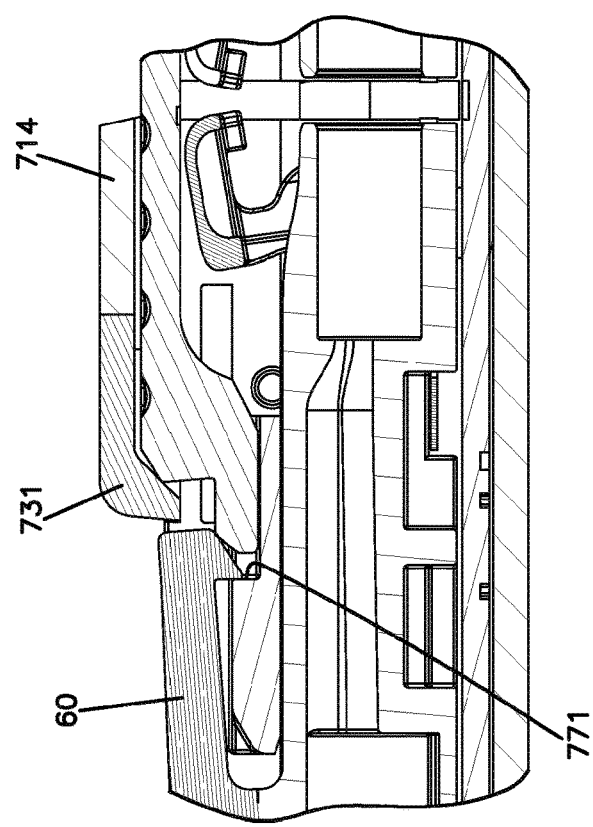
Figure 57:
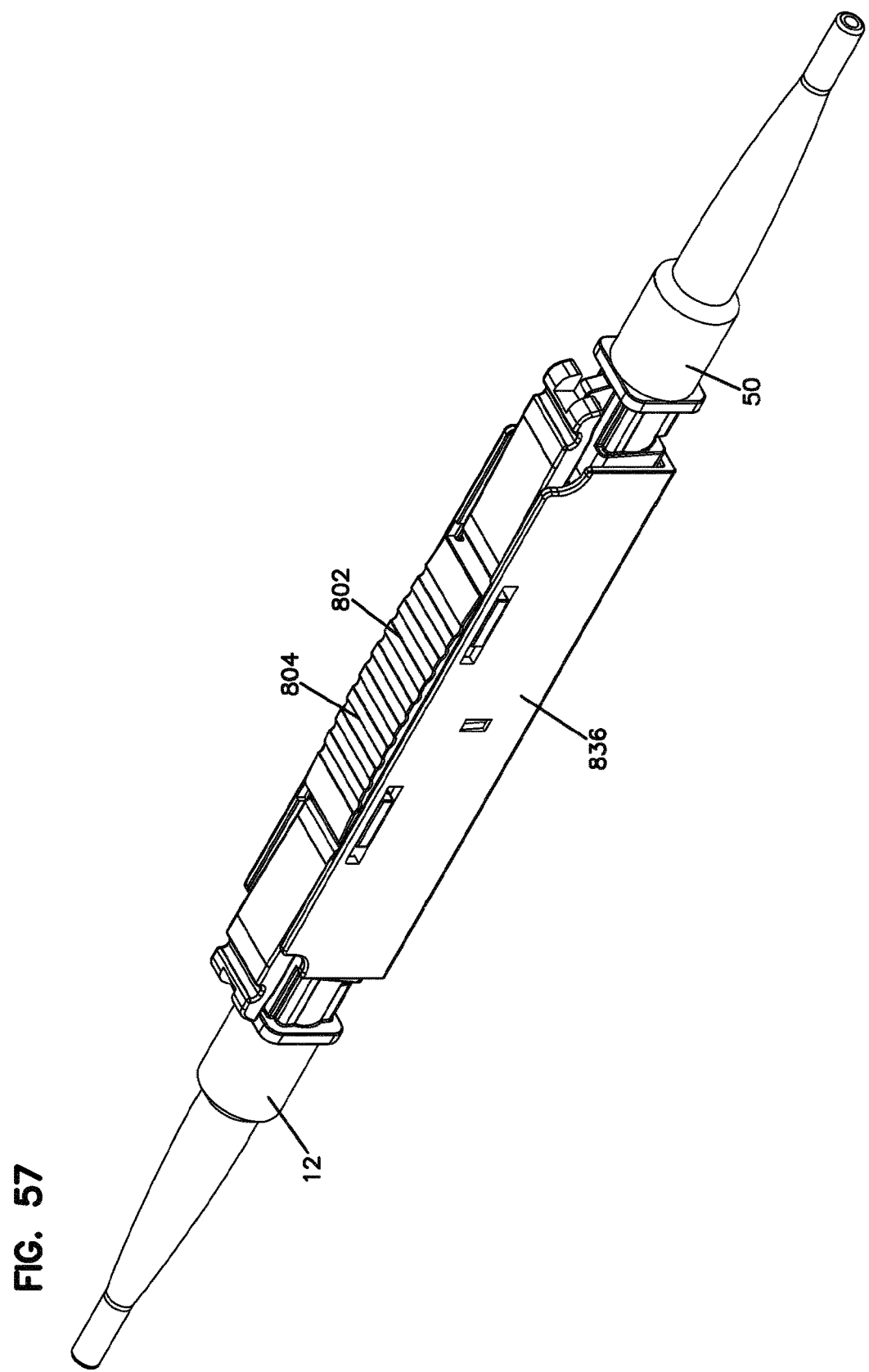
FIG. 57 is a front perspective view of another embodiment of an adapter configured for use with the system of FIGS. 47-56, the adapter shown with first and second connectors mated.
Figure 58:
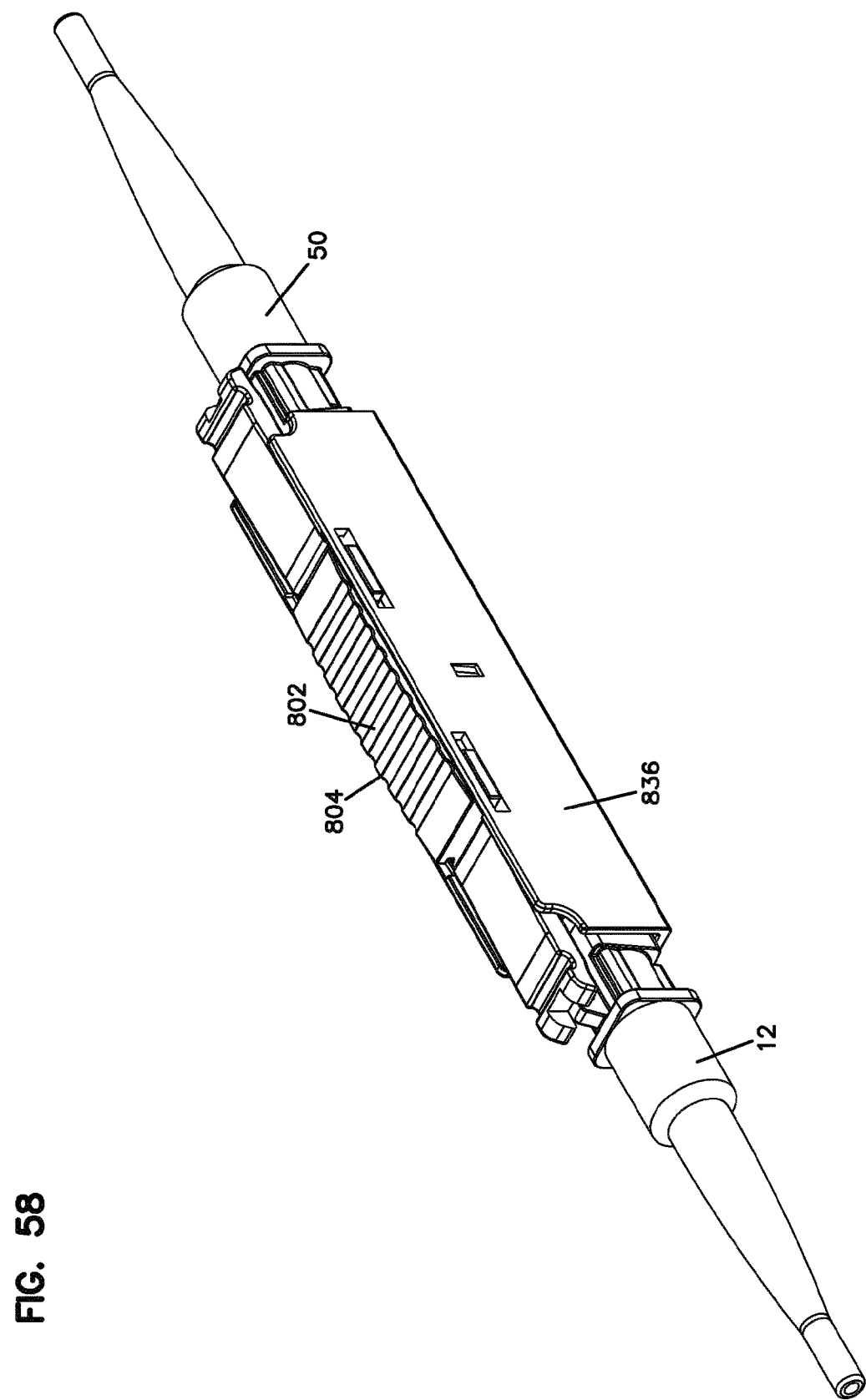
FIG. 58 is a rear perspective view of the adapter and connectors of FIG. 57.
Figure 59:
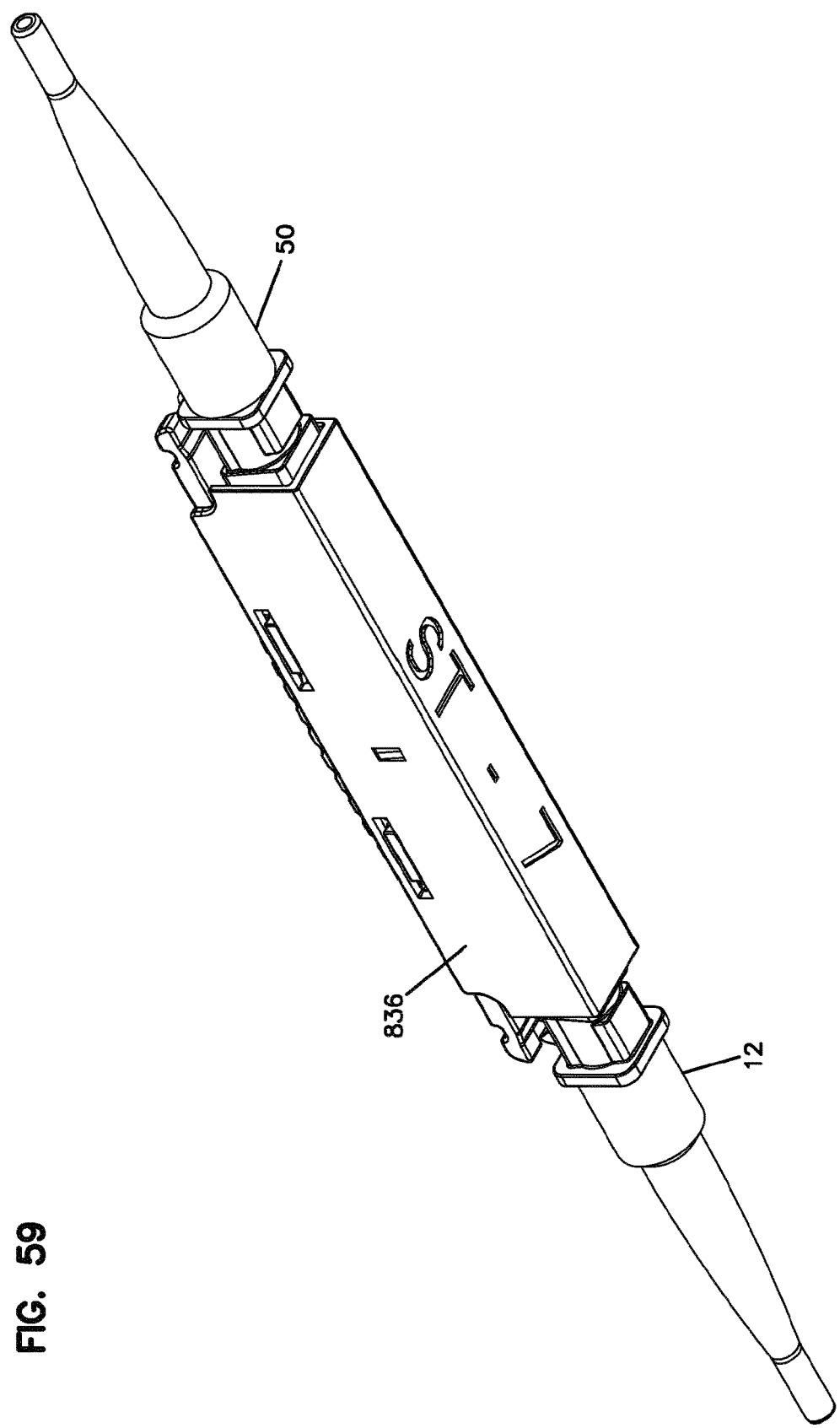
FIG. 59 is a bottom perspective view of the adapter and connectors of FIG. 57.
Figure 60:
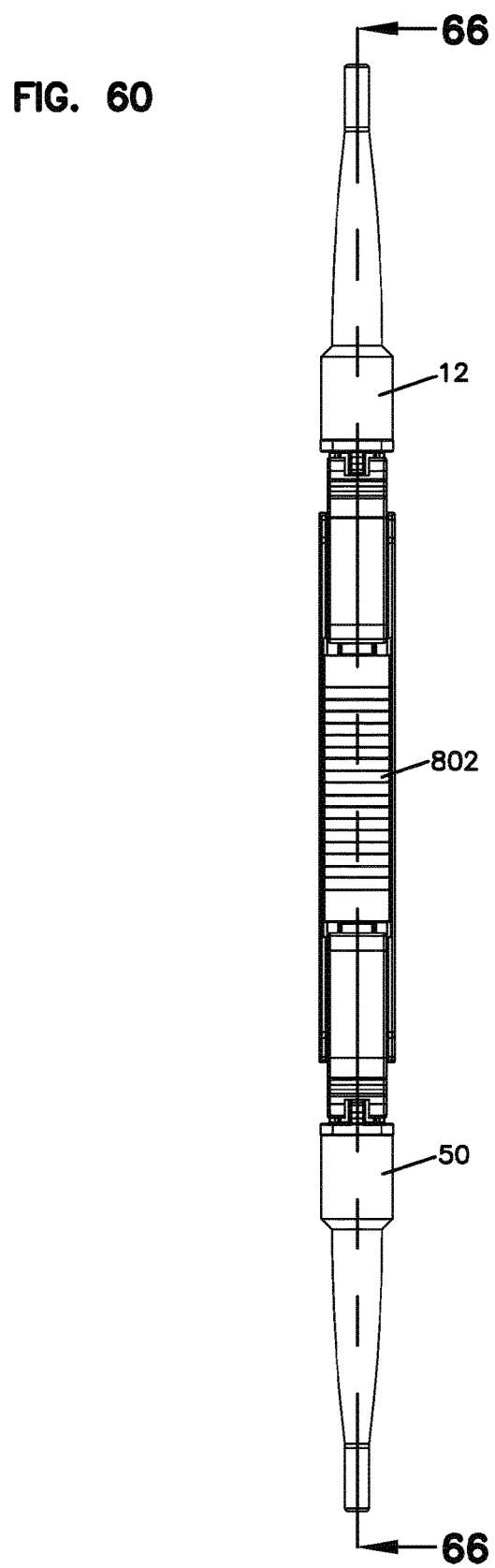
FIG. 60 is a top view of the adapter and connectors of FIG. 57.
Figure 61:
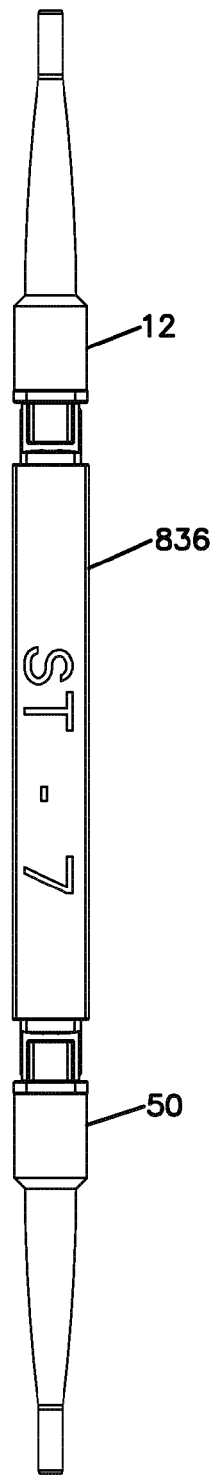
FIG. 61 is a bottom view of the adapter and connectors of FIG. 57.
Figure 62:
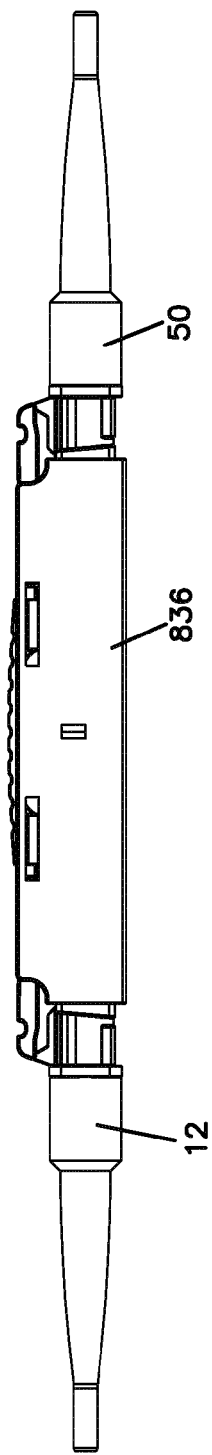
FIG. 62 is a left side view of the adapter and connectors of FIG. 57.
Figure 66:
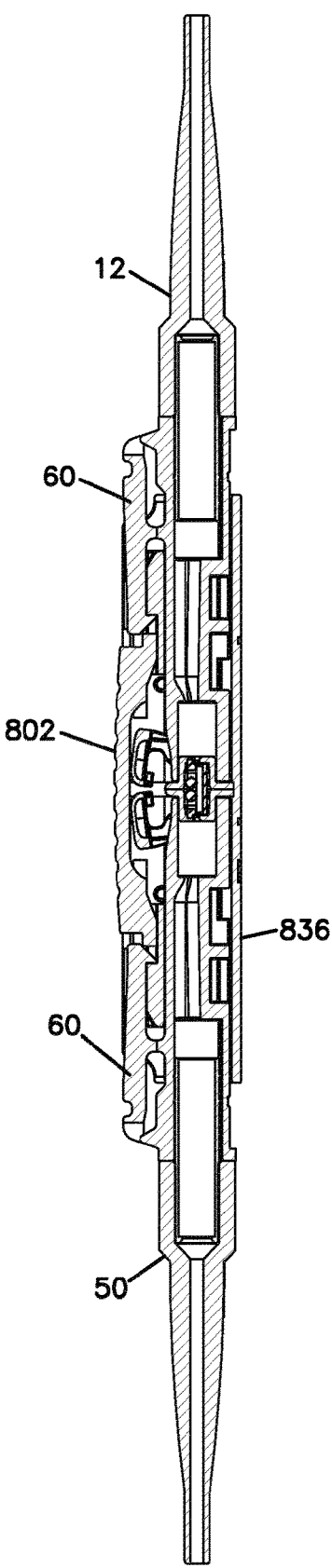
FIG. 66 is a cross-sectional view taken along line 66-66 of FIG. 60.
Figure 67:
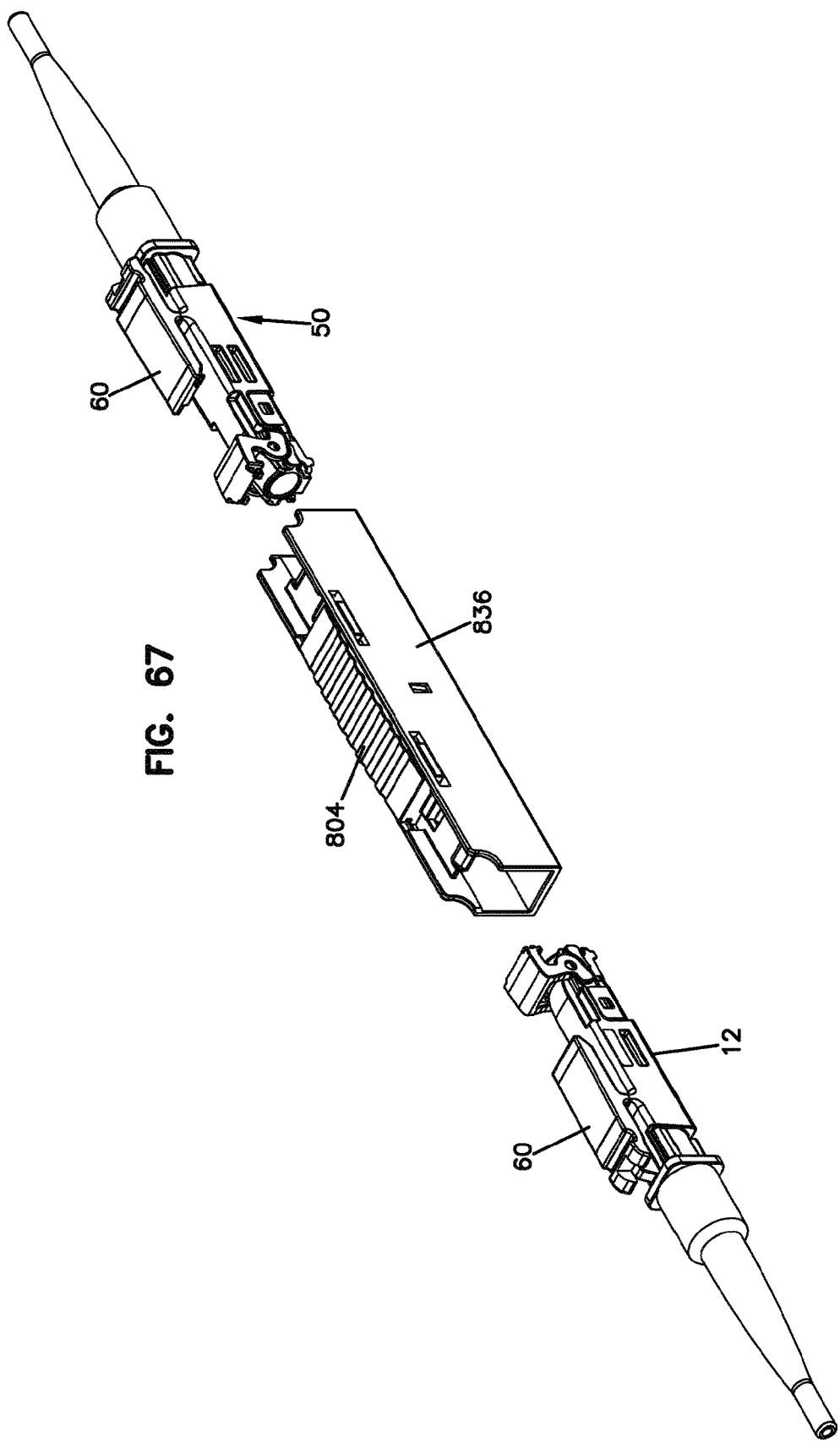
FIG. 67 illustrates the connectors exploded off the adapter of FIG. 57.

FIGS. 32-41 are various views of the connector holder system 600 wherein the mounting and the release of the adapter 636 and the second connector 50 to and from the first connector 12 that is held by the holder 614 are illustrated. FIGS. 42-45 illustrate the holder 614 in isolation. FIG. 46 illustrates a portion of the holder 614 with a first connector 12 attached to a clip 626 of the holder 614.

Still referring to FIGS. 32-46, in the embodiment shown, the holder 614 of the system 600 defines a plurality of pockets 620 for receiving the distal ends 22 of first connectors 12 and also the adapters 636. It should be noted that the inventive features of the holder 614 are applicable to versions that might have less or more pockets.

Each pocket 620 is cooperatively defined by a base 616 and a housing 618. In the embodiment shown, the holder 614 also includes a vertical wall 604 that defines openings 606 for each housing 618.

The vertical wall 604 might represent a portion (e.g., an exterior wall) of a device such as a tray, panel, module, cassette, or chassis. In such an example, the first fiber optic connector 12 may be positioned at a first side 608 of the wall 604 and not accessible from a second side 610 of the wall 604 that only provides access to the adapter 636 and the second connector 50.

For each pocket 620, the holder 614 includes a clip 626 which clips to first connector 12 to hold first connector 12 to holder 614. Similar to the embodiments discussed above, the clips 626 clip to the rear 24 of first connector 12. In the depicted embodiment, the clips 626 are u-shaped and include two clip arms 648. Other variations are possible. Each clip 626 is located at end 630 of housing 618 that is at the opposite end from the adapter insertion end of the housing 618.

The release mechanism 602 of the holder, as shown in FIGS. 37-41, is defined by a pivotable floor 601 of the base 616 of the holder 614. The pivotable floor 601 is integrally attached to the base 616 at a first end 603 and defines a free unattached end 605 that enables the floor 601 to act as a cantilever.

Figure 39:
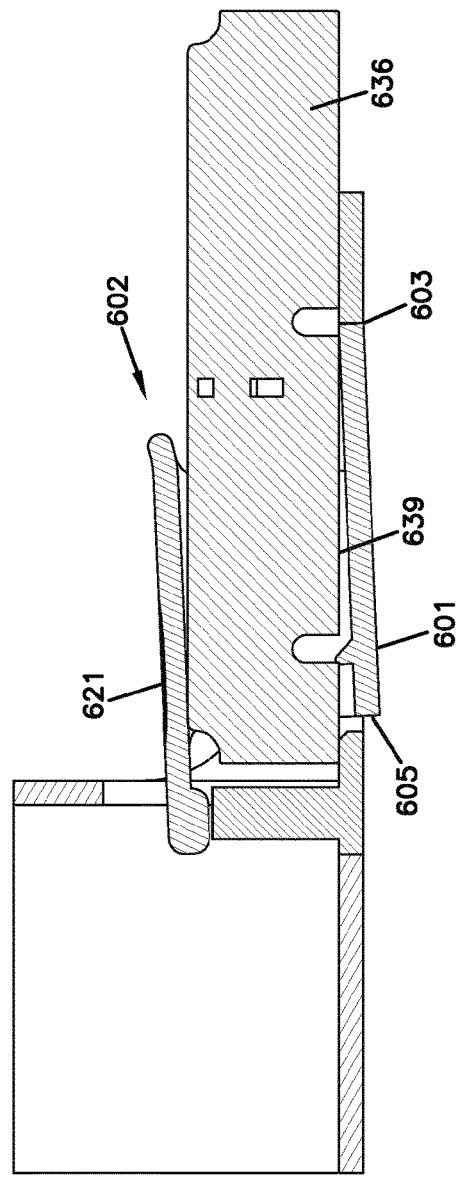
FIG. 39 is a cross-sectional view taken along line 39-39 of FIG. 38.
Figure 42:
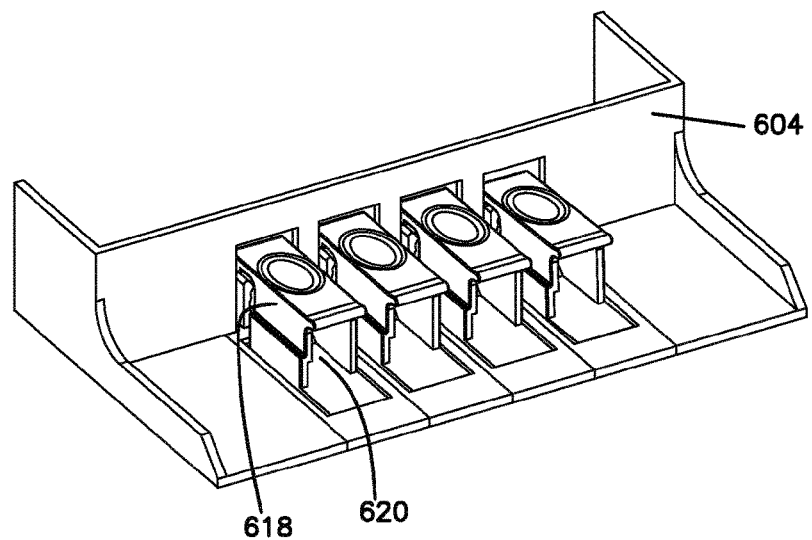
FIG. 42 is a front perspective view of the holder of the system of FIGS. 32-41.
Figure 43:
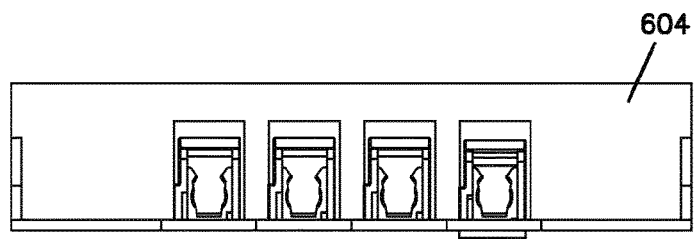
FIG. 43 is a rear view of the holder of FIG. 42.
Figure 44:
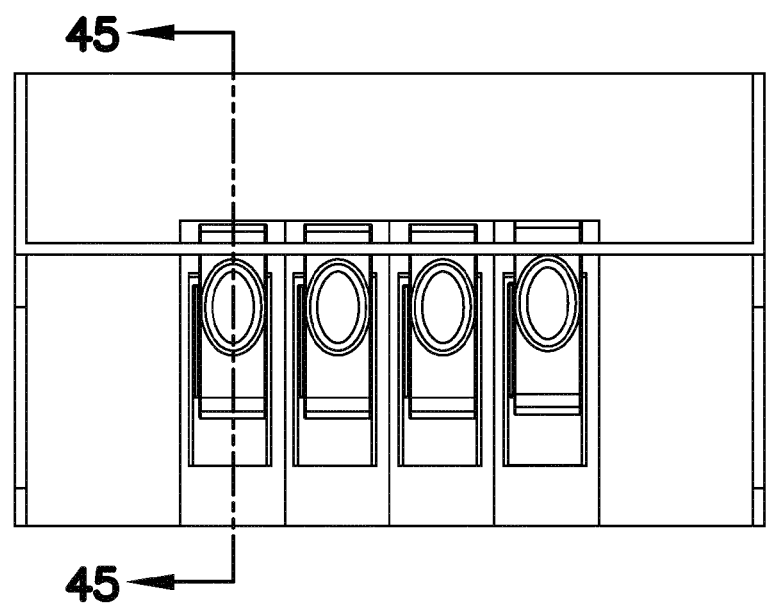
FIG. 44 is a top view of the holder of FIG. 42.
Figure 45:
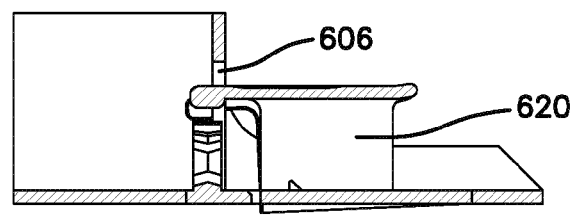
FIG. 45 is a cross-sectional view taken along line 45-45 of FIG. 44.

Once the first connector 12 has been inserted into the pocket 620 from the end 630 of the housing 618 and has been clipped to the clip 626, the adapter 636 is brought into the pocket 620 from the opposite end 632. When the adapter 636 is inserted into the pocket 620, as shown in FIG. 39, the front end 637 of the adapter 636 that is going to be latched with the connector 12 can be pivoted downwardly within the pocket 620. The pivoting of the adapter 636 is allowed because of the contact of the bottom 639 of the adapter with the pivotable floor 601. The floor 601 acts as a cantilever that allows the latch 60 of the first connector 12 to move over the catch 671 of the adapter 636 and to latch to the adapter 636.

When the adapter 636 is latched with the first connector 12, a tab 609 defined by the pivoting floor 601 also locks within a detent 611 defined on the adapter body 647 for axially engaging the adapter 636 with respect to the holder 614. This axial engagement is in addition to the engagement provided by the latch 60 of the first connector 12.

The removal of the adapter 636 from the holder 614 occurs in a similar fashion to insertion thereof. However, as shown in FIGS. 39-41, in addition to using the pivoting floor 601 of the base 616 to free the adapter 636 from the holder 614, the top 613 of the housing 618 is also used to initially free the adapter 636 from the first connector 12.

As shown in FIGS. 39-41, the top 613 of the housing 618 defines a flexible portion 621 that acts as a cantilever. By either pressing down on a first end 623 of the top 613 of the housing 618 or lifting up a second end 625 of the top 613 of the housing 618, a rear end 61 of the latch 60 of the first connector 12 is contacted. By pressing down on the rear end 61 of the latch 60, the front end 63 of the latch 60 can be freed from the catch 671 of the adapter 636.

Once the adapter 636 is freed from the first connector 12, the adapter 636 needs to be freed from the tab 609 defined by the pivotable floor 601. The rear end 641 of the adapter 636 can be pressed downwardly, lifting up the front end 637 and freeing the tab 609 from the detent 611 of the adapter 636. The flexibility of the top 613 of the housing 618 allows the front end 637 of the adapter 636 to be lifted up and the pivotability/flexibility of the floor 601 allows the adapter 636 to be slidably pulled out once the tab 609 has cleared the detent 611. In this manner, the adapter 636 can be taken out of the pocket 620 of the holder 614.

Figure 36:
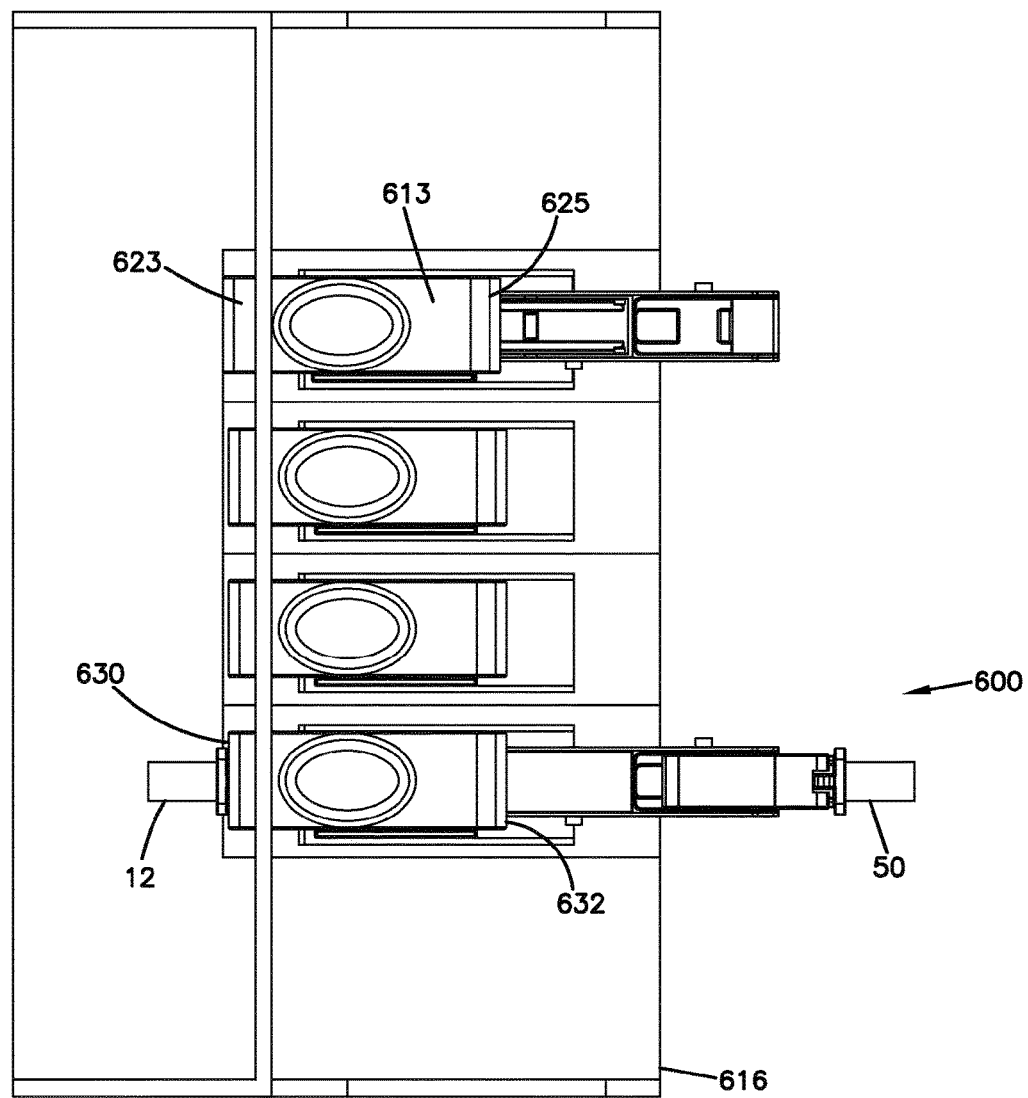
FIG. 36 is a top view of the system of FIG. 34.
Figure 37:
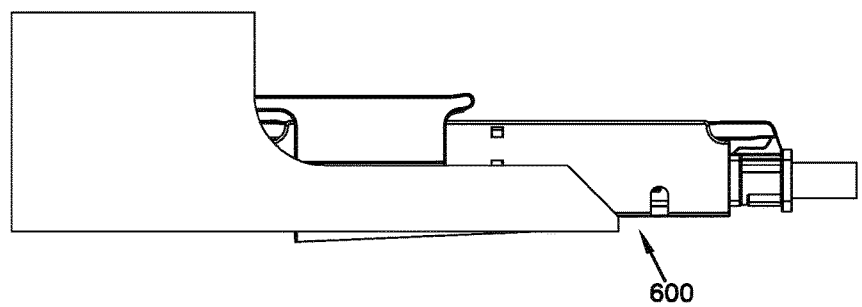
FIG. 37 is a side view of the system of FIG. 34.
Figure 38:
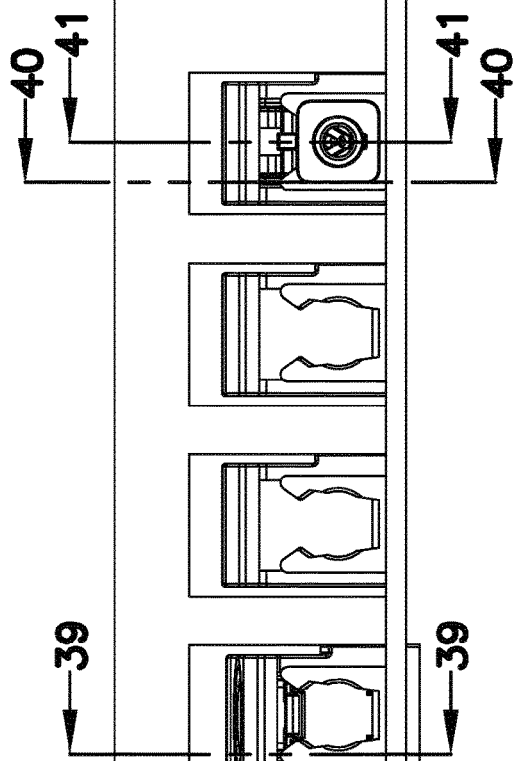
FIG. 38 is a rear view of the system of FIG. 34.

Referring now to FIGS. 34, 36, and 41, it should be noted that the first end 623 of the flexible portion 621 of the top 613 of the housing 618 can also be used in freeing the first connector 12 from the holder 614 if the user has access to the first side 608 of the vertical wall 604. The first end 623 of the top 613 of the housing 618 is positioned such that it is accessible from the first side 608 of the wall 604. If the first connector 12 is at a location that is accessible by the user and needs to be released from the adapter 636 and the second connector 50, the first end 623 of the top 613 of the housing 618 can be pressed downwardly by the user to free to first connector 12 from the adapter 636. The first connector 12 can, thus, be pulled out of the holder 614. The adapter 636 is prevented from being pulled out of the first side 608 of the wall 604 by the clip 626.

The embodiments discussed above are directed to holders that include the release mechanisms. According to another aspect of the disclosure, the release mechanism may be an integral part of the adapter that aligns the first and second fiber optic connectors. Similar to the embodiments discussed above with respect to FIGS. 25-46, the release mechanism of the adapter might allow a user to release the adapter and the second fiber optic connector from the first fiber optic connector when the first optic connector is not readily accessible to a user (e.g., when the first fiber optic connector is supported by a holder that is part of a fixture on a device such as a tray, panel, module, cassette, or chassis, wherein the first fiber optic connector is positioned inside such a device without access to the first connector from an exterior of the device).

FIGS. 47-56 illustrate such a system 700 wherein the release mechanism is an integral part of the adapter 736. FIGS. 47-51 illustrate various components of the system 700, while FIGS. 52-56 illustrate the sequence of operation in releasing the adapter 736 and the second fiber optic connector 50 from the first fiber optic connector 12 that may be held by the holder of the system 700.

FIGS. 57-71 show a variation of an adapter 836 for use with the system 700, wherein the adapter 836 has similar release features to the adapter 736 of system 700.

Referring back to FIGS. 47-56, the system 700 includes the adapter 736 having an integral release mechanism 702. The system 700 may include a holder 714 that facilitates use of the integral release mechanism 702 of the adapter 736 as will be described in further detail below.

The release mechanism 702 of the adapter 736 is defined by a slider 704 that is positioned at the top 713 of the adapter 736. The slider 704 is configured to be slidably moved by a user to release the latch 60 of a connector, either a first connector 12 or a second connector 50, from the catches 771 of an adapter 736.

The slider 704 defines a pair of first slide tabs 701 on opposing sides of the slider 704 adjacent the first end 703 of the slider 704 and a pair of second slide tabs 705 on opposing sides of the slider 704 adjacent the second end 707 of the slider. Each of a right sidewall 709 and a left sidewall 711 of the adapter 736 defines a first slot 715 adjacent the first end 743 of the adapter 736 and a second slot 717 adjacent the second end 745 of the adapter 736. The first slots 715 receive the first slide tabs 701 and the second slots 717 receive the second slide tabs 705 to allow the slider 704 to slidably move. The movement is limited by the slide tabs 701, 705 abutting with the ends of the slots 715, 717 that act as positive stops. The top 721 of the slider 704 defines a grip surface 723 to assist a user in using the slider 704.

The first and second ends 703, 707 of the slider 704 define release portions 725. As shown in the cross-sectional view of FIG. 50, the release portions 725 are configured to abut and wedge underneath the latches 60 of the connectors 12 to pivot the front ends 63 of the latches 60 of the connectors 12 to release the latches 60 from the catches 771 of the adapter 736. In this manner, if one of the connectors 12, 50 is not accessible to a user, the user can push the slider 704 toward the connector and release the latch 60 from the catch 771 of the adapter 736.

As noted above, the system 700 may also include a holder 714 that facilitates use of the integral release mechanism 702 of the adapter 736 as illustrated in FIGS. 47-56.

The holder 714, similar to previously discussed holders, defines a base 716 and a housing 718. A clip 726 is located at a first end 730 of the holder 714 for clipping in the first connector 12. Extending from a top 719 of the housing 718 of the holder 714 is a retention tab 731. The retention tab 731 is configured to contact a pair of tabs 733 positioned on the top 713 of the adapter 736 and retain the adapter within the housing 718 of the holder 714 and prevent the adapter 736 to be pulled out in a direction opposite to the direction of insertion into the housing 718.

When the slider 704 is used to release the latch 60 of the connector 12, the slider 704 also contacts the retention tab 731 to move and unlatch the retention tab 731 from the tabs 733 on the top 713 of the adapter 736. The deflection tab 731 is configured to be flexible such that when the slider 704 is used to release a connector from the adapter 736, the deflection tab 731 abuts a portion of the slider 704 and moves upwardly out of the way of the slider 704 as the release portion 725 of the slider 704 is abutting the latch 60 of a connector. For example, the sequence of operation for releasing an adapter 736 and a second connector 50 from a first connector 12 of the system 700 is shown in FIGS. 52-56.

The configuration of the release mechanism 702 of the system 700 allows a user to release the adapter 736 from the connector 12 and to pull the adapter 736 and the second connector 50 from the holder 714 with a single hand.

FIGS. 57-71 illustrate another embodiment of an adapter 836 having an integral release mechanism 802 that is configured for use with the system 700 of FIGS. 47-56. The adapter 836 of FIGS. 57-71 is similar in configuration to the adapter 736 shown in FIGS. 47-56 except for having a slider 804 with a different grip surface 823.

The above specification, examples and data provide a complete description of the manufacture and use of the composition of the invention. Since many embodiments of the invention can be made without departing from the spirit and scope of the invention, the invention resides in the claims hereinafter appended.

REFERENCE NUMERALS

10 Connector holder system
12 First fiber optic connector
14 Fiber optic connector holder
16 Base
18 Housing
20 Pocket
22 Distal end of first connector
24 Rear of first connector
26 Clip
28 Slots
30 End of holder
32 Opposite end of holder
34 Shutter
36 Adapter
40 Longitudinal axis
42 RFID tag location
44 Holes
46 Posts
48 Clip arms
50 Second fiber optic connector
54 First cable
56 Second cable
60 Latch
61 Rear end
63 Front end
70 Mounting arrangement
100 First tray
102 Structures
104 Cable pass through
106 Cable storage area
200 Second tray
202 Base
204 Cover
206 Slots
210 Buttons
212 Rear portion
300 Panel
302 Rows
400 Mounting block
402 Rows
500 Connector holder system
502 Release mechanism
506 Hinge
508 Top
510 Lever arm
511 First end
513 Second release end
514 Holder
516 Base
518 Housing
520 Pocket
526 Clip
530 End
532 Opposite end
536 Adapter
540 Longitudinal axis
548 Clip arms
571 Catch
600 Connector holder system
601 Pivotable floor
602 Release mechanism
603 First end
604 Vertical wall
605 Second end
606 Opening
608 First side
609 Tab
610 Second side
611 Detent
613 Top
614 Holder
616 Base
618 Housing
620 Pocket
621 Flexible portion
623 First end
625 Second end
626 Clip
630 End
632 Opposite end
636 Adapter
637 Front end
639 Bottom
641 Rear end
647 Adapter body
648 Clip arms
671 Catch
700 Connector holder system
701 First slide tab
702 Release mechanism
703 First end
704 Slider 705 Second slide tab
707 Second end
709 Right sidewall
711 Left sidewall
713 Top
714 Holder
715 First slot
716 Base
717 Second slot
718 Housing
719 Top
721 Top of slider
723 Grip surface
725 Release portion
726 Clip
730 First end
731 Deflection tab
733 Tab
736 Adapter
743 First end
745 Second end
771 Catch
802 Release mechanism
804 Slider
823 Grip surface
836 Adapter

What is claimed is:

1. A fiber optic adapter comprising:
a body configured to mate a first fiber optic connector with a second fiber optic connector, the first and second fiber optic connectors including latches for mating with catches of the adapter for releasably engaging the first and second connectors with the fiber optic adapter, wherein the latches are configured to be unlatched from the catches by direct contact with the latches, wherein the adapter has a release mechanism for allowing a user to release the latches of both of the first and second fiber optic connectors from the adapter without the user having to directly contact the latches of both of the first and second fiber optic connectors.

2. A fiber optic adapter according to claim 1, wherein the release mechanism includes a portion of the adapter that slides with respect to the rest of the body of the adapter.

3. A telecommunications system comprising:
a fiber optic adapter configured to mate a first fiber optic connector with a second fiber optic connector;
the first fiber optic connector mounted to the fiber optic adapter;
the second fiber optic connector mounted to the fiber optic adapter for optically mating with the first fiber optic connector;
wherein both of the first and second fiber optic connectors include latches for mating with catches of the fiber optic adapter for releasably engaging the first and second connectors with the fiber optic adapter, the latches configured to be unlatched from the catches by direct contact with the latches, wherein the adapter has a release mechanism for allowing a user to release the latches of both of the first and second fiber optic connectors from the adapter without the user having to directly contact the latches of both of the first and second fiber optic connectors.

4. A telecommunications system according to claim 3, wherein the release mechanism includes a portion of the adapter that slides with respect to the rest of the body of the adapter.

5. A telecommunications system according to claim 3, further comprising a fixture configured to fixedly hold at least one of the first and the second fiber optic connectors that is mounted to the adapter, the fixture configured to prevent axial movement of the connector when being released from the adapter.

6. A telecommunications system according to claim 5, wherein the fixture defines a plurality of locations for fixedly holding a plurality of fiber optic connectors for mounting to adapters.

* * * * *